(12) United States Patent
Slade

(10) Patent No.: US 9,714,519 B2
(45) Date of Patent: Jul. 25, 2017

(54) EXTENDABLE STRUCTURE

(75) Inventor: Richard Paul Slade, Kempston (GB)

(73) Assignee: ASTRIUM LIMITED, Stevenage, Hertfordshire (GB)

( * ) Notice: Subject to any disclaimer, the term of this patent is extended or adjusted under 35 U.S.C. 154(b) by 564 days.

(21) Appl. No.: 12/565,404

(22) Filed: Sep. 23, 2009

(65) Prior Publication Data

US 2010/0319270 A1   Dec. 23, 2010

(30) Foreign Application Priority Data

Jun. 18, 2009  (EP) .................................... 09275045

(51) Int. Cl.
*E04H 12/18* (2006.01)
*B64G 1/22* (2006.01)
*B64G 1/66* (2006.01)
*B64G 1/10* (2006.01)

(52) U.S. Cl.
CPC .......... *E04H 12/185* (2013.01); *B64G 1/222* (2013.01); *B64G 1/66* (2013.01); *B64G 2001/1092* (2013.01)

(58) Field of Classification Search
CPC . B64G 9/00; B64G 1/22; B64G 1/222; B64G 1/66; B64G 1/10; B64G 1/1007; B64G 2001/1092; E04C 3/005; E04B 1/343; E04B 1/34321; E04B 1/34357; E04B 1/3442; E04H 12/185
USPC ............. 52/63, 408, 645, 646, 648.1, 650.3, 52/651.01, 651.06, 653.1; 244/159.4, 244/159.5, 583; 343/881, 880, 882, 878, 343/915, 916
See application file for complete search history.

(56) References Cited

U.S. PATENT DOCUMENTS

| | | | | |
|---|---|---|---|---|
| RE18,204 E | * | 9/1931 | Straussler | 114/354 |
| 2,806,562 A | * | 9/1957 | Harman | 52/108 |
| 3,386,128 A | * | 6/1968 | Vyvyan | 16/225 |
| 3,435,570 A | * | 4/1969 | Berry | 52/109 |

(Continued)

FOREIGN PATENT DOCUMENTS

| | | |
|---|---|---|
| DE | 38 32 546 | 4/1989 |
| EP | 0754625 A1 | 1/1997 |

(Continued)

OTHER PUBLICATIONS

European Search Report issued in corresponding Application No. 09275045.4-1254 dated Dec. 7, 2009.

(Continued)

*Primary Examiner* — Theodore Adamos
(74) *Attorney, Agent, or Firm* — Buchanan Ingersoll & Rooney PC

(57) ABSTRACT

An extendable structure which may be used in space-based applications, for example forming the body of a telescope. The structure is movable between a stowed configuration and an extended configuration, and comprises a plurality of walls arranged to give a polygonal cross-section in the extended configuration. Each wall comprises a plurality of repeating units which are connected by a plurality of hinges. Each repeating unit itself comprises a plurality of sections connected by pluralities of first and second hinges, and in the extended configuration, each of the first hinges lies between two second hinges with the second hinges having axes which are inclined with respect to the first hinge axis.

17 Claims, 18 Drawing Sheets

(56) References Cited

U.S. PATENT DOCUMENTS

| | | | | |
|---|---|---|---|---|
| 3,474,488 | A | * | 10/1969 | Kruzich .................. 16/225 |
| 3,794,283 | A | * | 2/1974 | Furno ............... B23Q 1/5481 |
| | | | | 248/278.1 |
| 4,089,147 | A | * | 5/1978 | Bain ........................ 52/632 |
| 4,237,662 | A | * | 12/1980 | Kinzler ................ B64G 9/00 |
| | | | | 52/108 |
| 4,637,192 | A | * | 1/1987 | Brown ..................... 52/632 |
| 4,896,165 | A | * | 1/1990 | Koizumi ................. 343/881 |
| 5,027,892 | A | | 7/1991 | Bannon et al. |
| 5,086,999 | A | | 2/1992 | Mullen |
| 5,154,027 | A | * | 10/1992 | Warden .................... 52/108 |
| 5,163,262 | A | * | 11/1992 | Adams ..................... 52/646 |
| 5,184,444 | A | * | 2/1993 | Warden .................... 52/646 |
| 5,196,857 | A | * | 3/1993 | Chiappetta ........... B64G 1/22 |
| | | | | 244/159.5 |
| 6,017,002 | A | | 1/2000 | Burke et al. |
| 6,118,067 | A | | 9/2000 | Lashley et al. |
| 6,343,442 | B1 | | 2/2002 | Marks |
| 6,374,565 | B1 | * | 4/2002 | Warren .................... 52/653.2 |
| 6,904,722 | B2 | * | 6/2005 | Brown et al. .............. 52/121 |
| 6,910,304 | B2 | * | 6/2005 | Warren .................... 52/108 |
| 6,910,308 | B2 | * | 6/2005 | Cadogan et al. .......... 52/646 |
| 6,920,722 | B2 | * | 7/2005 | Brown et al. ............. 52/108 |
| 7,357,365 | B2 | * | 4/2008 | Colman ........... E04H 12/185 |
| | | | | 248/439 |
| 2005/0016109 | A1 | | 1/2005 | Rouse |

FOREIGN PATENT DOCUMENTS

| | | |
|---|---|---|
| FR | 2 873 353 | 1/2006 |
| JP | 59028704 A | 2/1984 |
| JP | 03-125697 | 5/1991 |
| JP | 03125697 A | 5/1991 |
| JP | H0930499 A | 2/1997 |
| WO | WO 00/34124 | 6/2000 |
| WO | WO 01/81821 | 11/2001 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Jan. 5, 2012, in the corresponding International Application No. PCT/EP2010/058562. (7 pages).

Notification of Transmittal of the International Search Report (Forms PCT/ISA/220 and PCT/ISA/210) and the Written Opinion of the International Searching Authority (Form PCT/ISA/237) issued in the European International Application No. PCT/EP2010/058562 dated Sep. 21, 2010.

Japanese Office Action (Notice of Reasons for Rejection) dated Mar. 10, 2014, issued in corresponding Japanese Application No. 2012-515499 (7 pgs).

* cited by examiner

EXTENDABLE STRUCTURE

TECHNICAL FIELD

The invention relates to an extendable structure, particularly but not exclusively for use in space-based applications.

BACKGROUND

Spacecraft are typically constrained in their dimensions by the volume available within the fairing of the launch rocket. This has led to the development of various types of deployable structure which can be stowed into a relatively small volume for launch, and later deployed to increase the dimensions of the spacecraft. For example, large components such as solar panels can be mounted on hinged booms which allow the panels to be folded alongside a satellite body during launch, and then unfolded once the satellite is in orbit to provide a much larger surface area. Such deployable structures may use motor-driven cables or hinges to control the unfolding of the structure, or alternatively may use sprung hinges which store elastic energy when folded and allow the structure to deploy under its own force, once a tie-down device is released. An example of such a self-deploying boom structure is disclosed in U.S. Pat. No. 6,343,442 B1.

Additionally, many applications may require use of a closed structure rather than a simply linear or planar structure. For example, it may be desired to provide a telescope shroud which is several metres in diameter and tens of metres in length, and has an internal cross-section which provides an unobstructed path for light beams, i.e. free from supporting booms/masts. Alternatively, a tube-like structure may be required for a sunshield or baffle, or may simply be desirable for the increased rigidity offered by a tubular or polygonal cross-section. Particularly in the case of a telescope body, which both shields the internal components and provides structural support, it is necessary for the deployed structure to have precisely controlled dimensions. Prior art solutions for tube-like deployable structures include telescoping structures which require complex and cumbersome mechanisms, and inflatable structures which are stiffened by chemical cross-linking in space but offer poor control over final dimensions.

SUMMARY

The present invention aims to address the drawbacks associated with known arrangements.

According to the present invention, there is provided an extendable structure movable between a stowed configuration and an extended configuration, the structure comprising a plurality of walls each comprising a plurality of repeating units, the walls being arranged such that in the extended configuration, each wall is substantially planar and the structure has a polygonal cross-section, wherein each repeating unit comprises a plurality of sections connected by pluralities of first and second hinges, wherein repeating units within each wall are connected by a plurality of third hinges, and wherein in the extended configuration, each of the first hinges lies between two second hinges and has a first hinge axis which is substantially perpendicular to a longitudinal edge of the wall, the second hinges having second hinge axes which are inclined with respect to said first hinge axis. The structure can therefore be folded into a compact stowed configuration, for example to enable a satellite incorporating the structure to fit into a launch rocket. The structure can then be deployed at a later stage, for example to move a payload, mounted to one end of the structure, a required distance away from a satellite body to which the structure is attached. The interior of the structure can remain largely unobstructed in both the stowed and extended configurations.

In the extended configuration, the first and second hinges and the longitudinal edge may define triangular regions on either side of each first hinge.

In the extended configuration a corner of the structure may be formed where longitudinal edges of two adjacent walls meet, and in the stowed configuration the structure may be folded along the first, second and third hinges such that said longitudinal edges remain substantially contiguous. A shroud made out of a single continuous sheet of material can be attached to the surface of the structure, and folded into the stowed configuration without stretching or tearing of the shroud along the edges of the structure.

In the extended configuration, the first and second hinges within a wall may lie on a single plane, and in the stowed configuration, said first and second hinges may be moved out of said plane.

The structure may have a regular polygonal cross-section of N sides in the extended configuration, and an angle α between the first and second hinge axes may be given by $$\alpha = 90°/N$$

Each wall may be connected to an adjacent wall by a plurality of fourth hinges. These hinges can provide additional structural support in the extended configuration, increasing the rigidity of the extended structure.

In the extended configuration each one of the fourth hinges may be arranged to open to an internal angle of the polygon which forms the cross-section of the structure.

Each one of the first, second and third hinges may be arranged to open to an angle of 180° in the extended configuration, such that the sections attached to the hinge are coplanar.

The first and second hinges may cooperate such that in the stowed configuration, a plurality of sections which form the corners of the structure are folded back towards an interior of the structure.

In the stowed configuration, a point at which first and second hinges meet within a repeating unit may be displaced away from an interior of the structure.

The extendable structure may form a body of a telescope, and further comprise a flexible shroud attached to at least one of the inner and outer surfaces of the structure, the shroud being arranged to block transmission of light through the walls of the structure. A telescope can therefore be provided with a long optical bench, whilst being able to be stowed into a relatively small volume for loading into a launch rocket.

The plurality of sections may comprise first and second triangular sections, each of the second triangular sections being substantially twice the length of each of the first triangular sections.

The plurality of sections may comprise at least one of solid panels, panels including openings, or frames.

At least one of the first, second, third and fourth hinges may comprise tape-spring hinges, and the tape-spring hinges may be arranged to store elastic strain energy in the stowed configuration such that the hinges exert a force on the structure which urges the structure towards the extended configuration. The structure can therefore be made self-deployable, i.e. made to deploy automatically on release of a tie-down device, without the need to apply an external force to extend the structure. Since tape-spring hinges have a tendency to lock-out to a straight configuration, the structure can be made to reliably lock-out into an extended configuration with the desired dimensions.

Each one of the first, second and third hinges may comprises tape springs arranged on both sides of the sections attached to the hinge, the tape springs on opposite sides having opposing curvatures, and each one of the fourth hinges may comprise tape springs arranged on a single side of the sections attached to the hinge. The double-sided tape spring arrangement provides a non-eccentric load path, increasing a resistance of the hinge to buckling, and preventing the hinge from overshooting the required angle during extension of the structure.

At least one of the plurality of sections, and first, second, third and fourth hinges may be formed from a carbon-fibre reinforced polymer composite. This material enables construction of a strong, lightweight, rigid structure.

The extendable structure may further comprise a plurality of studs fixed to the internal and/or external surface of the structure, and the plurality of studs may be arranged such that they align in the stowed configuration to provide a continuous load path from top to bottom of the structure. The structure can therefore be pre-loaded in the stowed configuration by compression along the line of the studs. The studs can also control the separation distance between sections in the stowed configuration.

The structure may be linearly tapered from one end of the structure to the other, such that a cross-section at one end is smaller than a cross-section at the other end. This arrangement may be used, for example, in a telescope which has a converging light beam, where it is not necessary for the structure to have a cross-section of uniform size along its length.

BRIEF DESCRIPTION OF THE DRAWINGS

Embodiments of the invention will now be described, by way of example, with reference to the accompanying drawings, in which.

DETAILED DESCRIPTION

Figure 1:
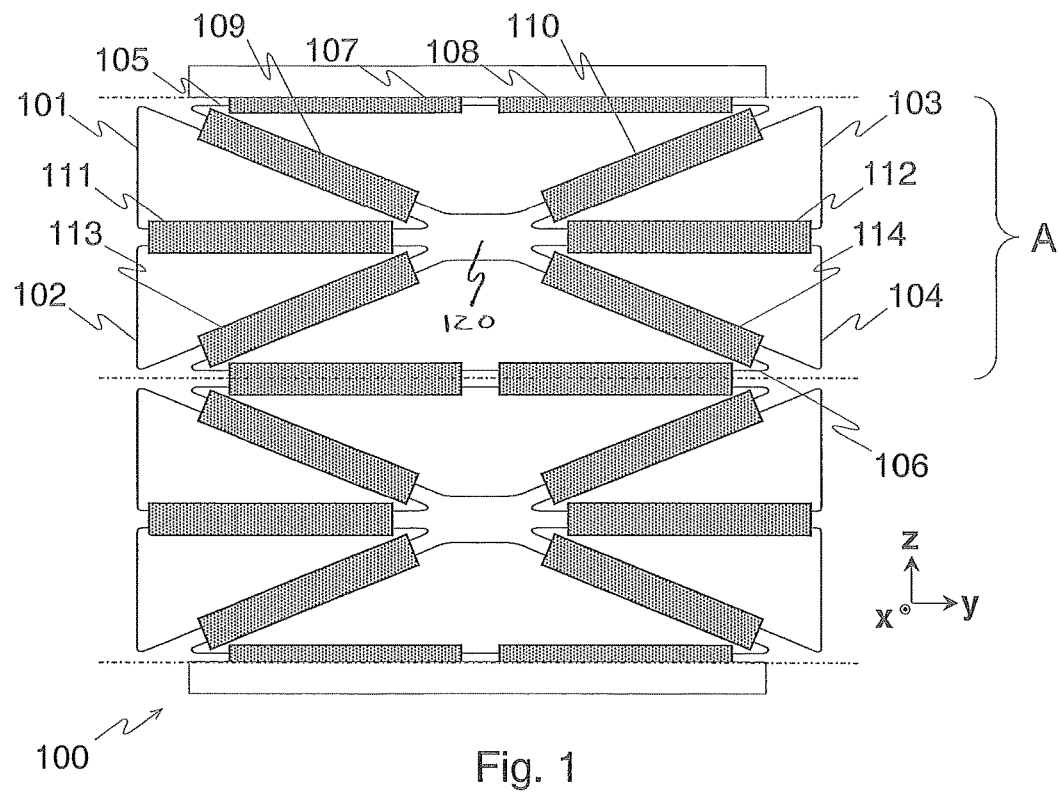
FIG. 1 illustrates a section of an extendable structure made up of multiple repeating units according to an embodiment of the present invention, in the fully-extended configuration.

FIG. 1 illustrates part of a wall section 100 of an extendable structure, according to an embodiment of the present invention. The wall section 100 is shown with the structure in the fully-extended configuration. It can be seen that the wall section comprises a plurality of similar units (indicated by bracket A), which are linked together and repeat along the z-axis. Each of these repeating units itself comprises six triangular panels 101, 102, 103, 104, 105 and 106, which are arranged such that the overall shape of the basic repeating unit is substantially rectangular. The triangular panels are linked to each other by a plurality of hinges 109, 110, 111, 112, 113 and 114. The repeating unit A is itself linked to adjacent units in the z-direction by additional hinges (e.g. hinges 107 and 108).

Together, these hinges can be divided into two groups. In the first group, there are first hinges 107, 108, 111 and 112 which have axes perpendicular to the direction of extension (i.e. the z-axis in this embodiment). In the embodiment shown, the first hinges all have axes parallel to the y-axis, although this group could also comprise any hinge having an axis lying in the x-y plane. In the second group, there are second hinges 109, 110, 113 and 114 which have axes inclined with respect to the first group. Both the first and second hinges are arranged on lines which intersect the centre point of the repeating unit. The second hinges allow the structure to be collapsed into a stowed configuration as will now be described with reference to FIGS. 2, 3a and 3b.

Figure 2:
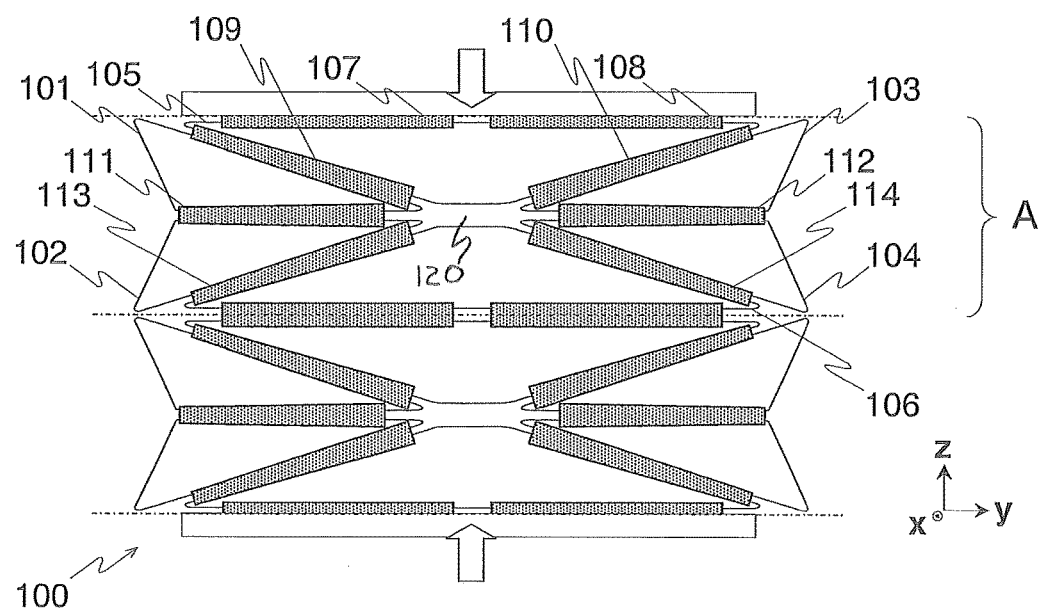
FIG. 2 illustrates the section of the extendable structure shown in FIG. 1, in a partially-collapsed state.

FIG. 2 illustrates the same wall section 100 shown in FIG. 1, but in a partially-collapsed state. As the structure 100 collapses along the z-axis, second hinges 109, 110, 113 and 114 allow the smaller triangular panels 101, 102, 103 and 104 to fold back between the larger panels 105 and 106. Further compression along the z-axis will lead the structure 100 to adopt a fully-collapsed state in which the panels 101, 102, 103, 104, 105 and 106 are all substantially parallel and lie on top of one another.

Figure 3A:
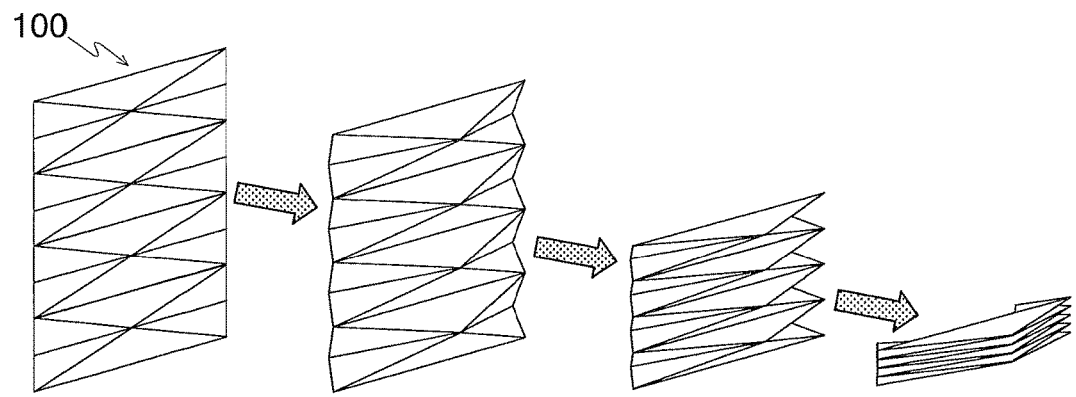
FIG. 3a illustrates in perspective view the extendable structure shown in FIGS. 1 and 2, in various stages of extension.
Figure 3B:
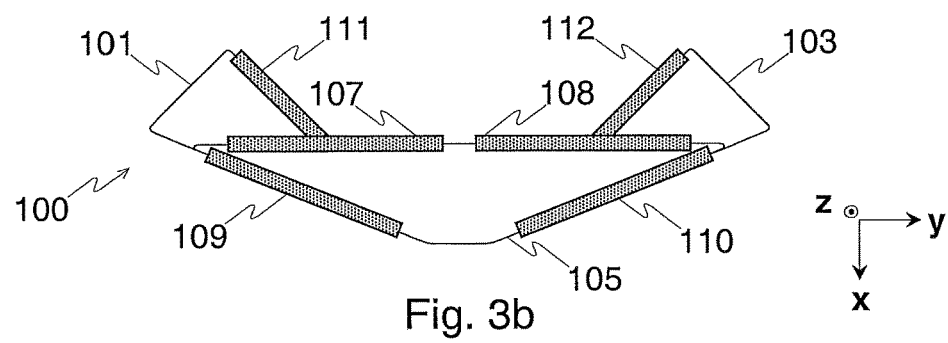
FIG. 3b illustrates the section of the extendable structure shown in FIGS. 1 and 2, in the fully-collapsed configuration.

The relationship between the fully-extended and fully-collapsed configurations is clearly shown by FIG. 3a, which illustrates the structure 100 in various stages of extension. The smaller triangular panels fold back between the larger panels, and are sandwiched between the larger panels when the structure is in the fully-collapsed configuration, with all panels lying substantially parallel to one another in the horizontal plane. This fully-collapsed state is illustrated in FIG. 3b, which shows the wall section 100 as viewed along the z-axis. It can clearly be seen that folding the smaller sections 101, 102, 103 and 104 back in this way reduces the profile of the collapsed structure. This configuration allows the structure to be collapsed for storage into a small volume, relative to an overall length of the structure in its fully-extended state (c.f. FIG. 1).

Figure 4:
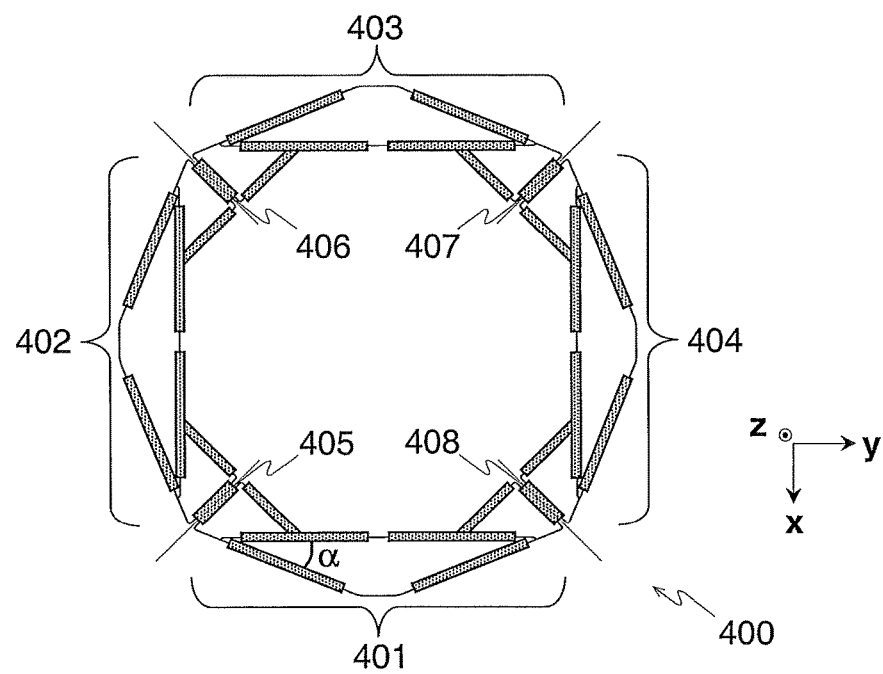
FIG. 4 illustrates an extendable structure according to another embodiment of the present invention, formed by connecting several wall sections similar to that shown in FIGS. 1-3.

Another advantage of this structure is that multiple wall sections may be connected to form an extendable structure with a polygonal cross-section. FIG. 4 illustrates an embodiment in which four wall sections 401, 402, 403 and 404 are connected at their side edges to form an extendable structure 400 which has a square cross-section when extended (FIG. 4 shows the structure in the fully-collapsed configuration). However, in other embodiments a different number of wall sections may be connected. The angle α shown in FIG. 4 can be varied to adjust the angle at which adjacent wall sections (e.g. 401 and 402) connect to each other in the fully-collapsed state. In the present embodiment α is 22.5°, but for example, adjusting α to 30° allows three wall sections to be connected giving a triangular cross-section.

The structure 400 is tube-like, i.e. it is hollow and has a closed perimeter wall, with a cross-section which is polygonal rather than circular due to the planar side walls. For a tube-like structure having a regular polygon with N sides as its cross-section, the general principle is that α=90/N (degrees). However, it is also possible to construct structures with irregular polygonal cross-sections, in which case α will also vary with the relative side lengths of the polygon.

In the embodiment illustrated in FIG. 4, each wall section is connected by its side edges to adjacent wall sections by a plurality of third hinges 405, 406, 407 and 408. In the fully-collapsed configuration, each of these hinges are opened to an angle of 180°, with the triangular panels connected by the hinge lying side-by-side in the same plane.

Figure 5:
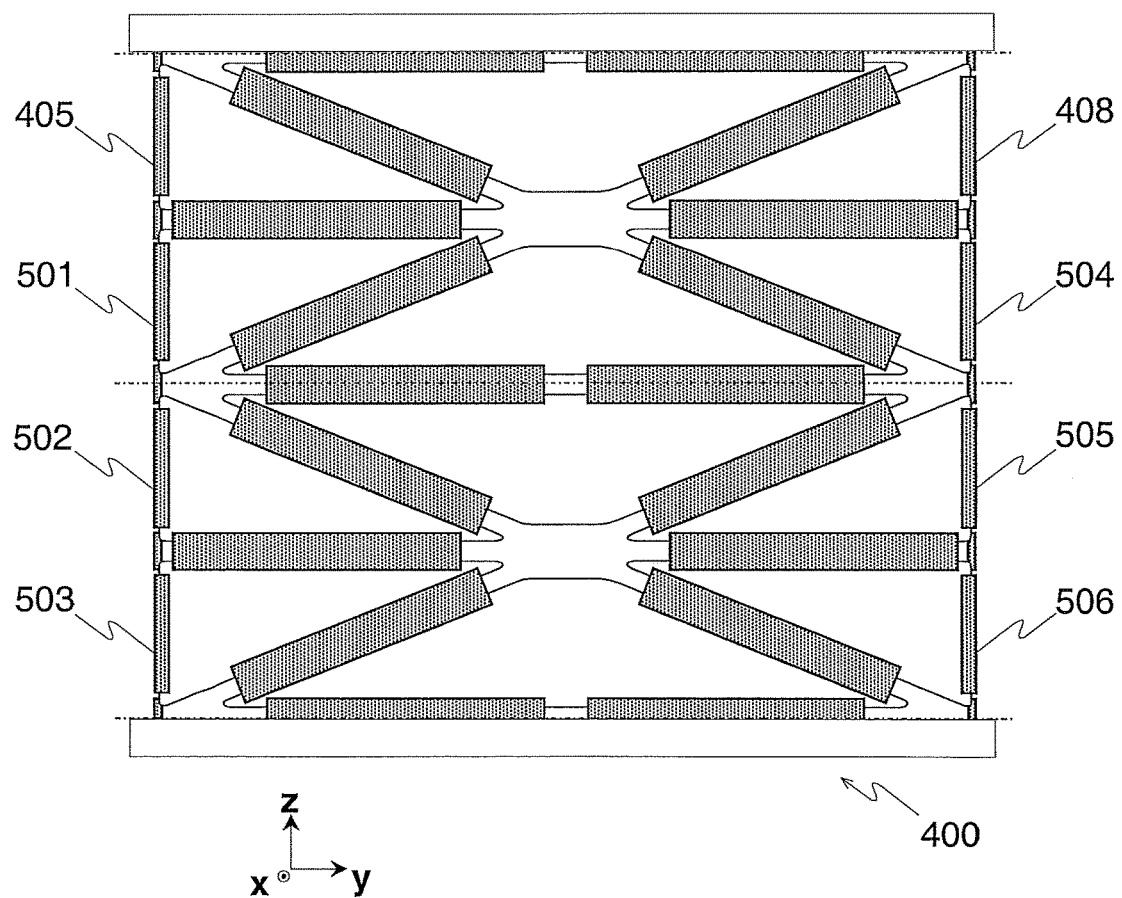
FIG. 5 illustrates the extendable structure shown in FIG. 4, in the fully-extended configuration.

FIG. 5 shows a side-on view of the structure illustrated in FIG. 4. The structure is shown in the extended configuration, and it can clearly be seen that the third hinges 405, 408, 501, 502, 503, 504, 505, 506 lie along the side edges of the wall section 401 (i.e. at the corners of the structure 400, when viewed along the z-axis in the fully-extended state). Since the structure has a square cross-section, the panels connected by each one of the third hinges 405, 408, 501, 502, 503, 504, 505, 506 make an angle of 90° in the fully-extended configuration. This corresponds to the internal angle of a square. However, the skilled person will appreciate that this angle will depend on the number of walls used to construct a tube-like structure, i.e. whether the structure is triangular, square, pentagonal, hexagonal etc. in cross-section. The angle will also depend on whether the cross-section is uniform along the length of the structure, i.e. whether the structure is tapered from one end to the other. If the structure is tapered, the edges of each side wall may not be parallel, and so the 90°/N rule will not be applicable. Tapered cross-sections will also result in a more complex folding geometry, which may require the use of additional hinges.

Figure 6:
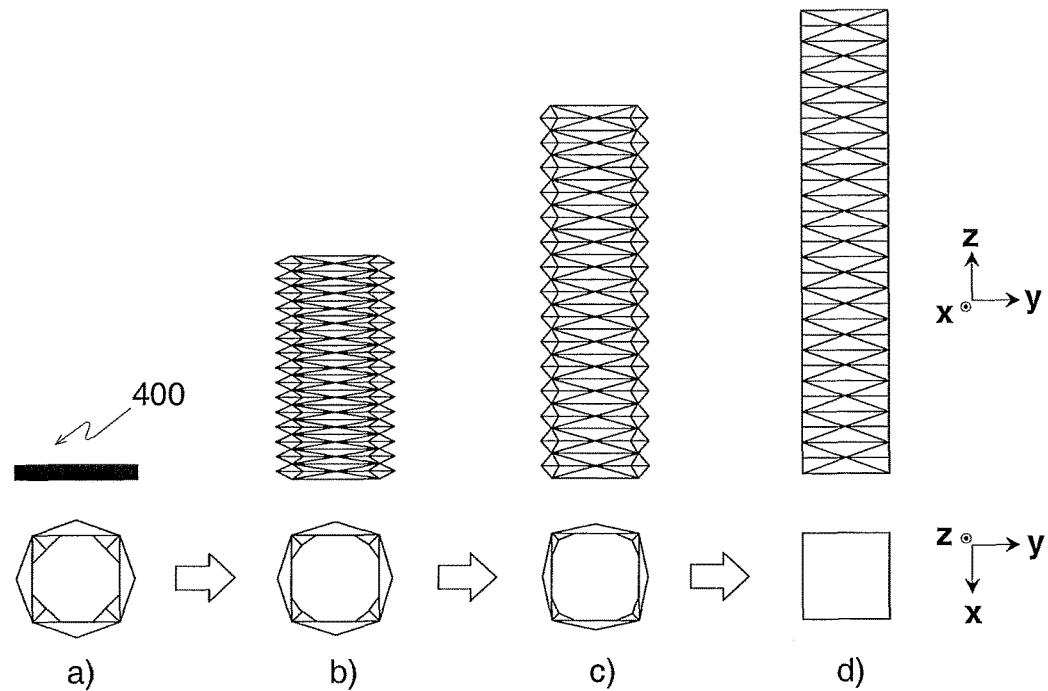
FIGS. 6a to 6d illustrate the extendable structure shown in FIGS. 4 and 5, in various stages of extension.
Figure 7:
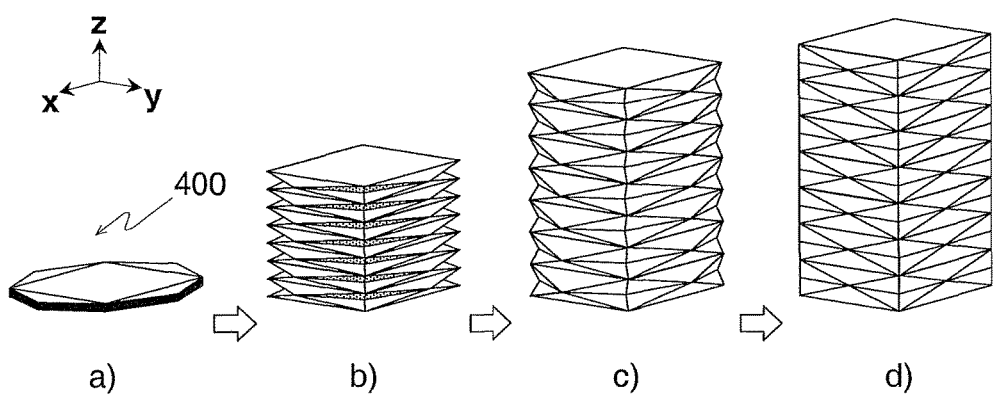
FIGS. 7a to 7d illustrate the stages of extension shown in FIGS. 6a to 6d, in 3-D perspective.

FIGS. 6a to 6d illustrate the structure 400 of FIGS. 4 and 5 in various stages of extension, from stowed (i.e. fully collapsed) in FIG. 6a to deployed (i.e. fully extended) in FIG. 6d. The top row of images correspond to a side-on perspective similar to that shown in FIG. 5, whilst the bottom row of images correspond to a top-down view similar to that shown in FIG. 4. FIG. 7 shows a similar deployment sequence using a perspective view.

The embodiments discussed above provide a variety of extendable structures which are capable of being collapsed into a small volume. In certain embodiments, the structures may be deployed by application of an external force in the direction of extension, for example by means of cables tethered to one end of the structure. However, in alternative embodiments which will now be described with reference to FIGS. 8 to 13, the force required for extension of the structure is provided by means of tape-spring hinges which store elastic strain energy whilst the structure is in the collapsed state.

Figure 8A:
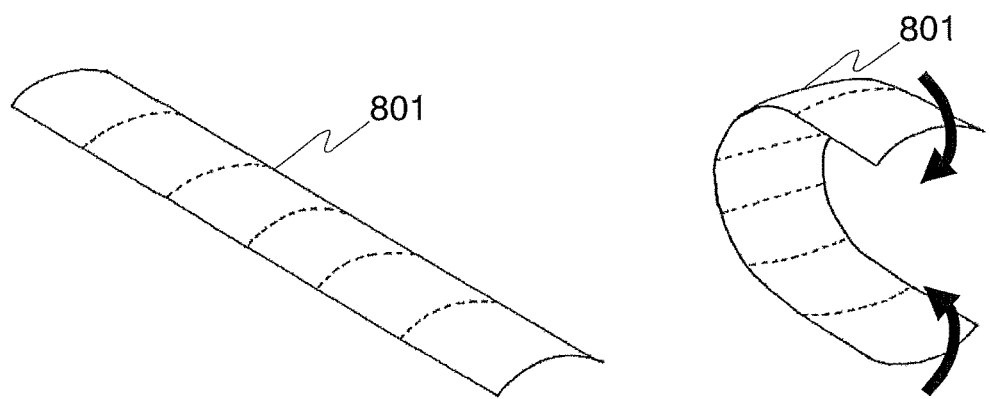
FIGS. 8a to 8c illustrate tape-spring hinges used in an extendable structure, according to an embodiment of the present invention.
Figure 8B:
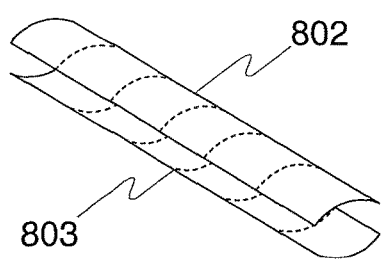
Figure 8B:
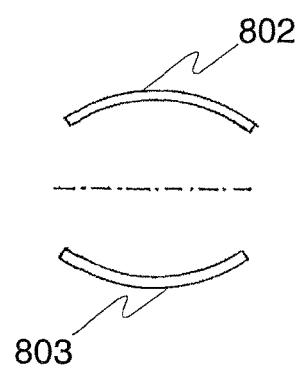
Figure 8C:
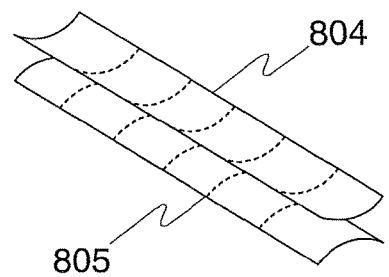
Figure 8C:
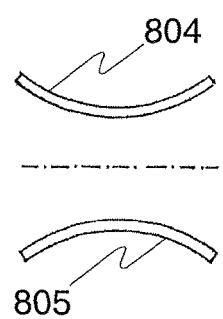

FIGS. 8a to 8c illustrate the basic principle of operation of a tape-spring hinge. The hinge 801 is formed as a thin-walled strip which is curved across its width to a relatively shallow radius of curvature, similar to a reel tape measure. The tape-spring 801 is manufactured from a resilient material and hence can store a significant amount of elastic strain energy when deformed as shown in FIG. 8a. This stored energy provides a restoring force which gives a deformed tape-spring a tendency to snap back to its original straight configuration when a closing force is removed. The curved cross-section also gives the tape-spring additional rigidity when in the straight, un-deformed state.

A hinge can be formed either from a single tape-spring (e.g. FIG. 8a), or from a pair of tape-springs arranged back-to-back as shown in FIGS. 8b and 8c. FIG. 8b illustrates a hinge formed by arranging two tape-springs 802 and 803 on opposite sides of a panel with their concave sides facing each other (the dash-dot line denotes the plane of the panel). Alternatively, as shown in FIG. 8c, tape-springs 804 and 805 may be arranged with convex sides facing each other. Either of these configurations may be advantageous in certain applications over the single-spring hinge shown in FIG. 8a, as these double-spring hinges increase the rigidity of the structure in the extended configuration. The double-spring arrangement also provides a self-centring function, which prevents overshoot when the structure is deployed by ensuring that the hinge does not open beyond the desired 180° angle. Additionally, as the double-spring arrangement has a cross-section which is symmetric about the plane of the wall section, a non-eccentric load path is provided which enhances the ability of the hinge to resist buckling under compression. One feature of the tape-spring hinge which is shared by all embodiments in FIGS. 8a, 8b and 8c, is the tendency of the hinge to lock-out into the extended (i.e. straight) configuration.

When tape-springs are used to form the hinges connecting adjacent panels within a wall section, the tape-springs store elastic strain energy when the structure is collapsed for storage. This provides a restoring force which causes the structure to open up and extend as the tape-spring hinges straighten. This makes it necessary to store the structure in the collapsed state under compression, but also means that on removal of this compressive force the structure will extend on its own under the force provided by the deformed hinges. Even when the tape-spring hinges are relatively thin and only exert a weak force, in a zero-gravity environment (e.g. on a satellite in orbit) this force will be sufficient to cause the structure to extend without the need to apply an external force. It is therefore possible to make the structure self-deploying by employing tape-spring hinges.

Figure 9A:
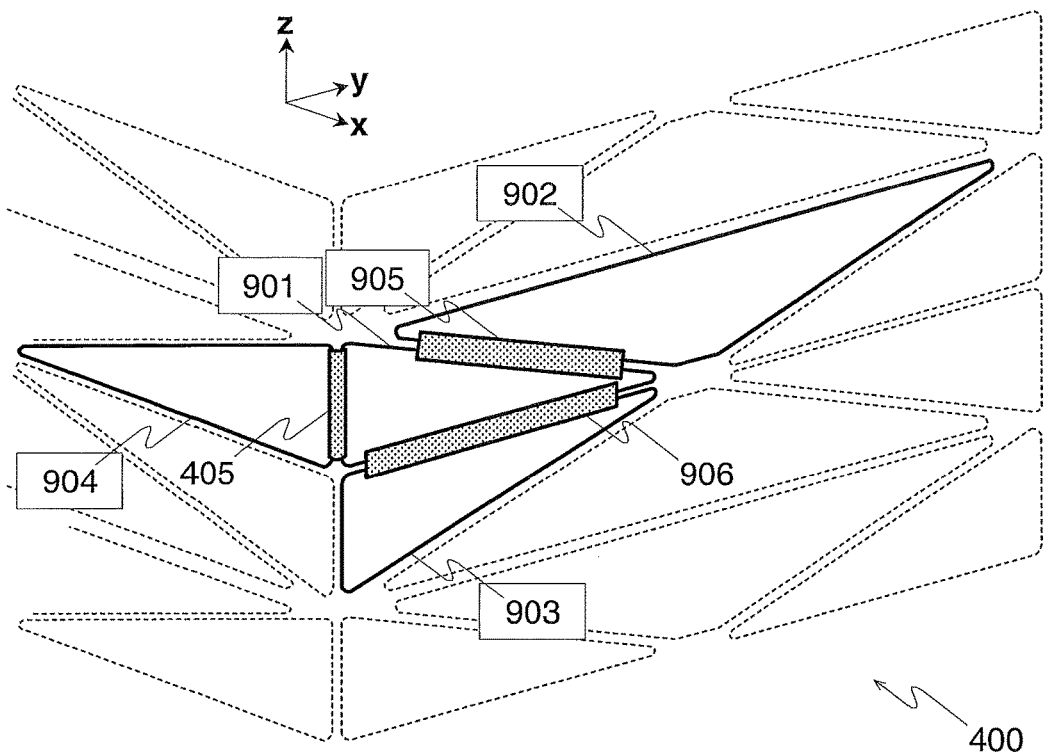
FIGS. 9a and 9b illustrate detail of hinges used in the extendable structure shown in FIGS. 4 and 5, in both the fully-extended and fully-collapsed configurations.
Figure 9B:
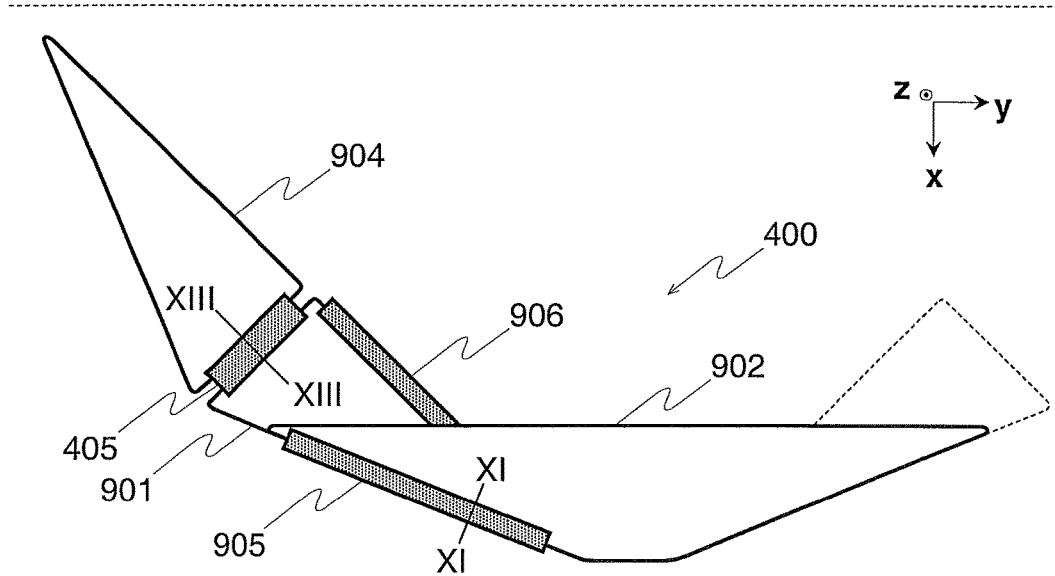

FIGS. 9a and 9b illustrate the extendable structure 400 (c.f. FIGS. 4 and 5) in both the fully-extended (FIG. 9a) and fully-collapsed (FIG. 9b) configurations. For clarity, a single panel 901 has been highlighted along with the directly adjacent panels 902, 903 and 904, and connecting hinges 905, 906 and 405.

From FIGS. 9a and 9b, it is clear to see the arrangement of each of the tape-spring hinges 905, 906 and 405 in both the fully-extended and fully-collapsed configurations. These hinges can be categorised into two distinct types, based on their angles of opening in the extended and collapsed states. The first category, hereinafter referred to as type I hinges, comprises hinges 905 and 906. These hinges are opened to an angle of 180° in the fully-extended configuration (c.f. FIG. 9a), and are closed (i.e. 0° or 360°) in the fully-collapsed configuration (c.f. FIG. 9b). The second category, hereinafter referred to as type II hinges, comprises hinge 405, which is opened to an angle of 90° in the fully-extended configuration, and opened to an angle of 180° in the fully-collapsed configuration. Referring briefly back to FIGS. 1 and 5, it can be seen that hinges 107, 108, 109, 110, 111, 112, 113 and 114 are all type I hinges, whilst hinges 405, 408, 501, 502, 503, 504, 505 and 506 are all type II hinges.

Figure 10:
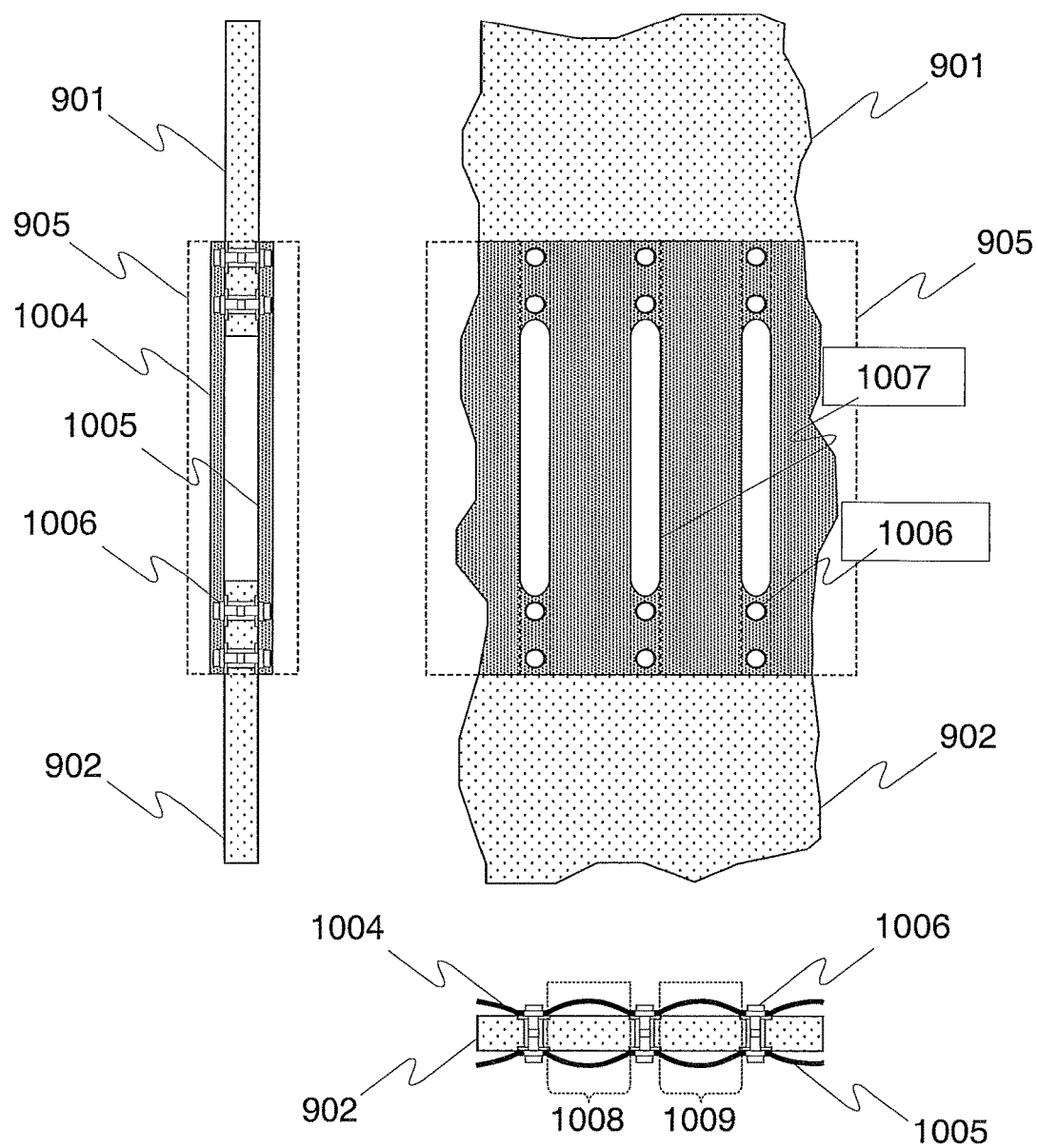
FIG. 10 illustrates in greater detail one type of hinge used in the extendable structure shown in FIGS. 9a and 9b, in the fully-extended configuration.

FIG. 10 illustrates the structure of the type I hinge 905 (c.f. FIGS. 9a and 9b) which is arranged to lock-out the attached panels 901 and 902 to an angle of 180° (i.e. panels 901 and 902 are coplanar when the hinge is locked-out). The hinge 905 comprises two tape-spring panels 1004 and 1005, each of which is formed as a single component and comprises a plurality of integrated tape-springs. The tape-springs can clearly be seen in cross-section as curved portions (e.g. 1008 and 1009). Each tape-spring is separated by a flat region which is fixed to panel 1001 or 1002 by bolts (e.g. bolt 1006), and also separated by an opening in the panel. For example, tape-springs 1008 and 1009 are separated by opening 1007. When a tape-spring hinge is bent, the hinge deforms by flattening out at the apex leading to an increase in width, and hence openings such as 1007 are provided to accommodate this width increase.

In the present embodiment, the tape-spring panels 1004 and 1005, and the panels 901 and 902, are all formed from a carbon-fibre reinforced polymer composite. Panels 901 and 902 have a higher stiffness than the tape-spring hinges due to their greater thickness. However, the present invention is not limited to this one material, and in alternative embodiments the panels 901 and 902 and/or the tape-spring panels 1004 and 1005 may be formed from different materials.

Figure 11:
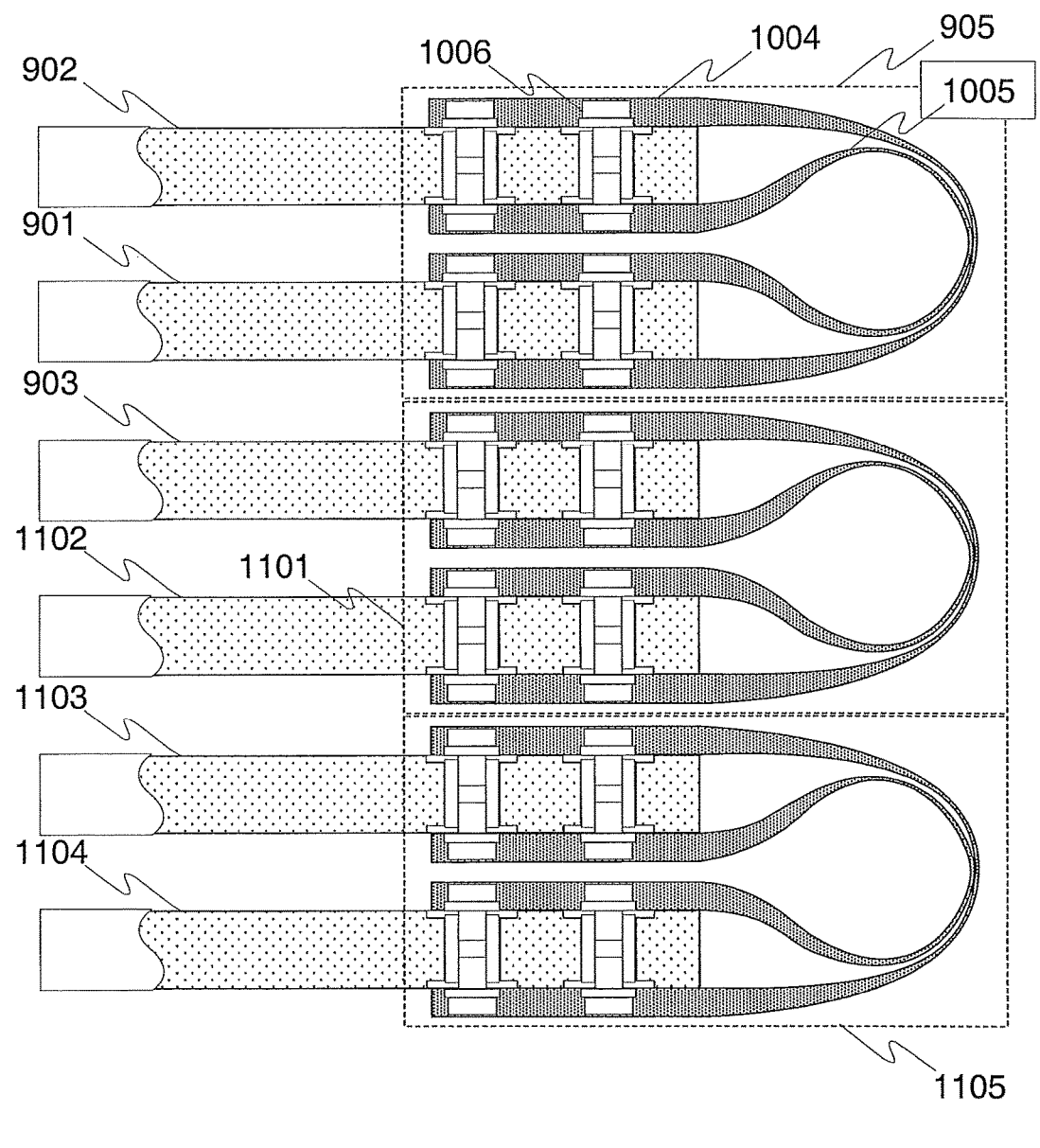
FIG. 11 shows a cross-section taken through a portion of FIG. 9b, showing the hinge shown in FIG. 10 in the collapsed configuration.

FIG. 11 illustrates a cross-section taken along the line XI-XI indicated in FIG. 9b. It can be seen that panels 901, 902 and 903 stack directly on top of each other when the structure is in the fully-collapsed configuration.

Figure 12:
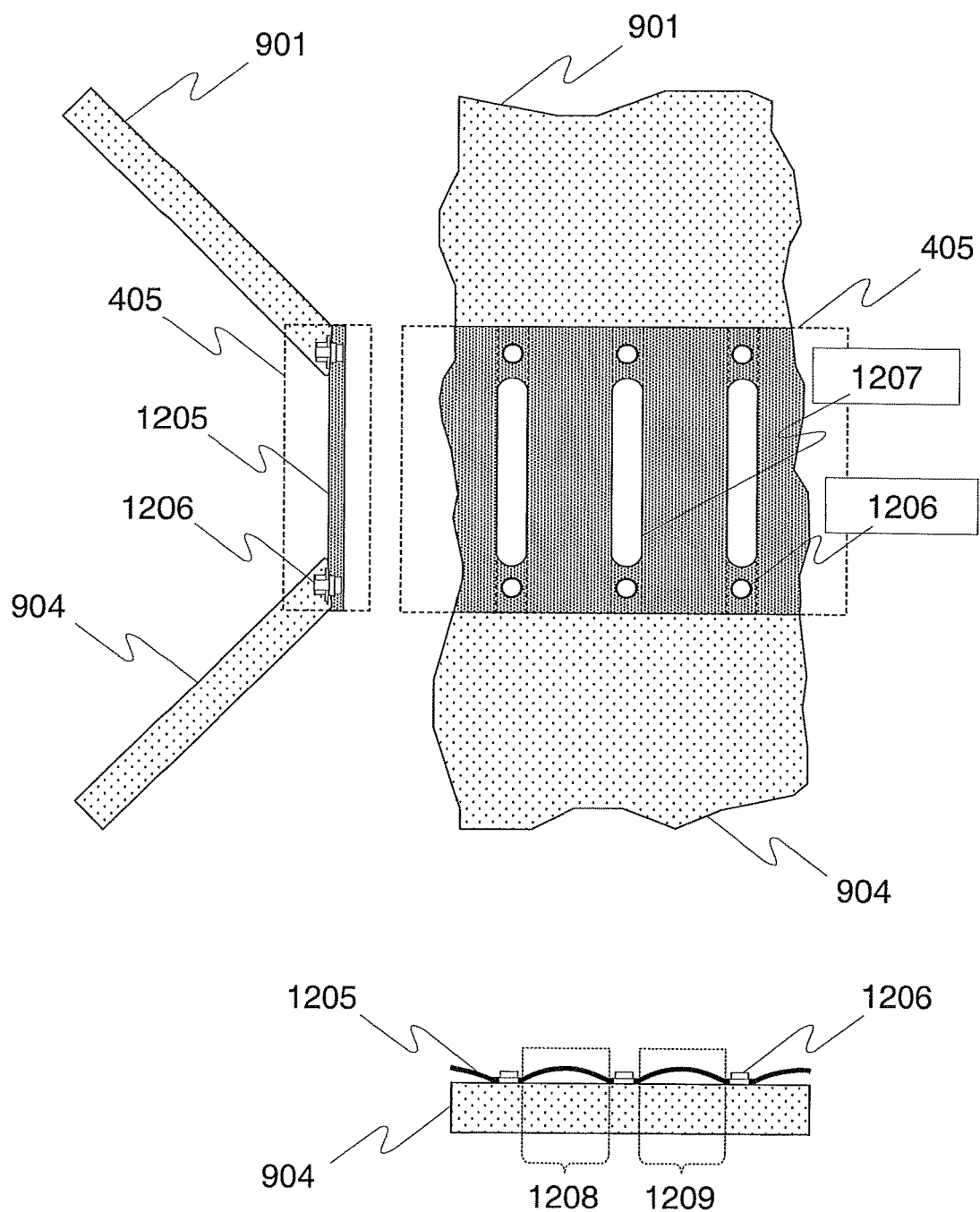
FIG. 12 illustrates in greater detail another type of hinge used in the extendable structure shown in FIGS. 9a and 9b, in the fully-extended configuration.

FIG. 12 illustrates the structure of the type II hinge 405 (c.f. FIGS. 9a and 9b), when the tube-like structure is in the fully-extended configuration. This type II hinge 405 is arranged to lock-out the attached panels 901 and 904 to an angle of 90° in the fully-extended configuration, thereby forming the corners of the polygonal cross-section of the structure. The hinge comprises a single sheet of tape-springs 1205, unlike the double-spring arrangement of hinge 905 (c.f. FIG. 10). The type II hinges are primarily subjected to shear stresses when the structure is in the fully-extended configuration, and hence the additional rigidity provided by a double-spring hinge is not essential. Selecting a single-spring arrangement for the type II hinges, instead of the alternative double-spring arrangement, has the advantage that the overall weight, complexity and cost of the structure is reduced. Nonetheless, alternative embodiments are possible which employ a double-spring arrangement for type II hinges by mounting two springs back-to-back, with suitable spacers at the panel attachments.

Because the tape-spring hinge has a natural tendency to lock-out to 180°, the desired 90° angle for a type II hinge is achieved by mounting the tape-spring sheet 1205 to the panels 901, 904 at a 45° angle. The skilled person will appreciate that other angles can be achieved (i.e. when alternative cross-sections are chosen for the structure), by varying the angle of attachment to the panels 901, 904. As with the type I hinge 905, hinge 405 is fixed to the panels by bolts 1206. The structure of the tape-spring sheet is substantially similar to that of the type I hinge, comprising a plurality of tape springs 1208, 1209 separated by openings 1207.

Figure 13A:
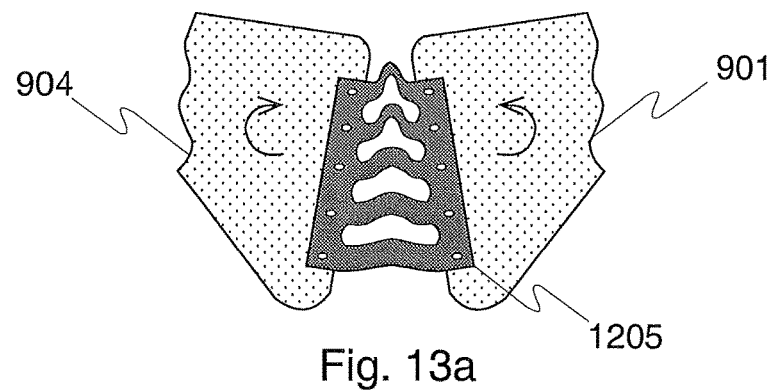
FIG. 13a illustrates the tape-spring hinge shown in FIG. 12, flexing to accommodate in-plane rotation of the attached panels.

FIG. 13a illustrates the tape-spring hinge shown in FIG. 12, flexing to accommodate in-plane rotation of the attached panels 901 and 904 relative to one another. As the structure extends or collapses, the smaller triangular panels (i.e. the panels which form the corners of the structure in the fully-extended configuration) are subjected to a small relative in-plane rotation. The effect of this rotation is to cause a gap between the panels to narrow at one end as the structure initially extends from the fully-collapsed configuration, and then re-open as the structure nears the fully-extended configuration. In the present embodiment, the tape-spring sheet 1205 flexes to accommodate this rotation by straightening the tape-springs towards one end of the hinge, as shown in FIG. 13a.

Figure 13B:
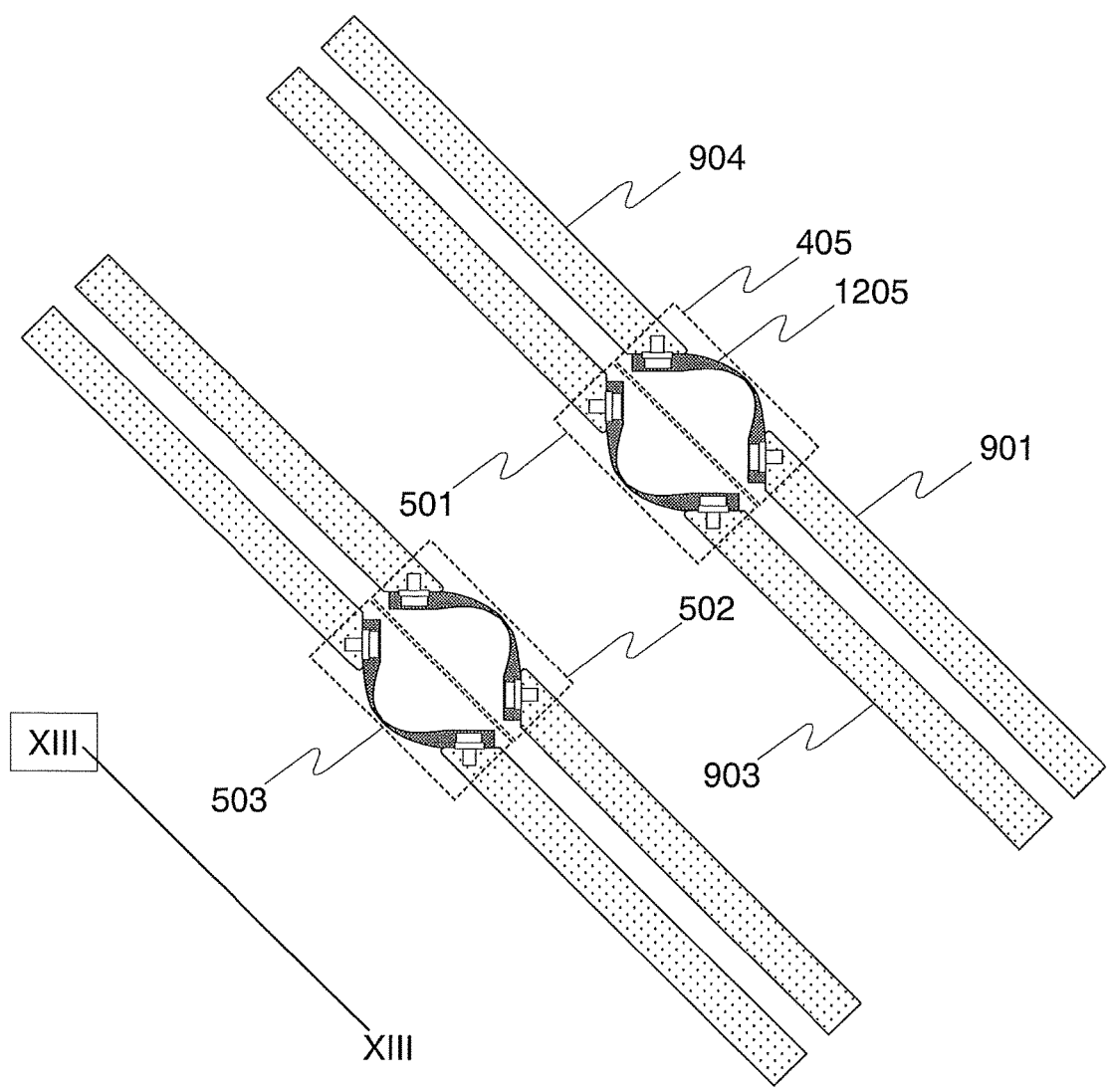
FIG. 13b shows a cross-section taken through another portion of FIG. 9b, showing the hinge shown in FIG. 12 in the collapsed configuration.

FIG. 13b illustrates a cross-section taken along the line XIII-XIII indicated in FIG. 9b. It can be seen that panels 901 and 903 stack directly on top of each other when the structure is in the fully-collapsed configuration, whilst panels 904 and 901 lie adjacent to one another in the same plane (i.e. hinge 405 is opened to 180°). Hinges 405, 501 (c.f. FIG. 5) lie directly on one another, as do hinges 502, 503, with each pair of hinges being separated a gap. This gap is occupied by a pair of large triangular panels (not shown), similar to panel 902.

Figure 14:
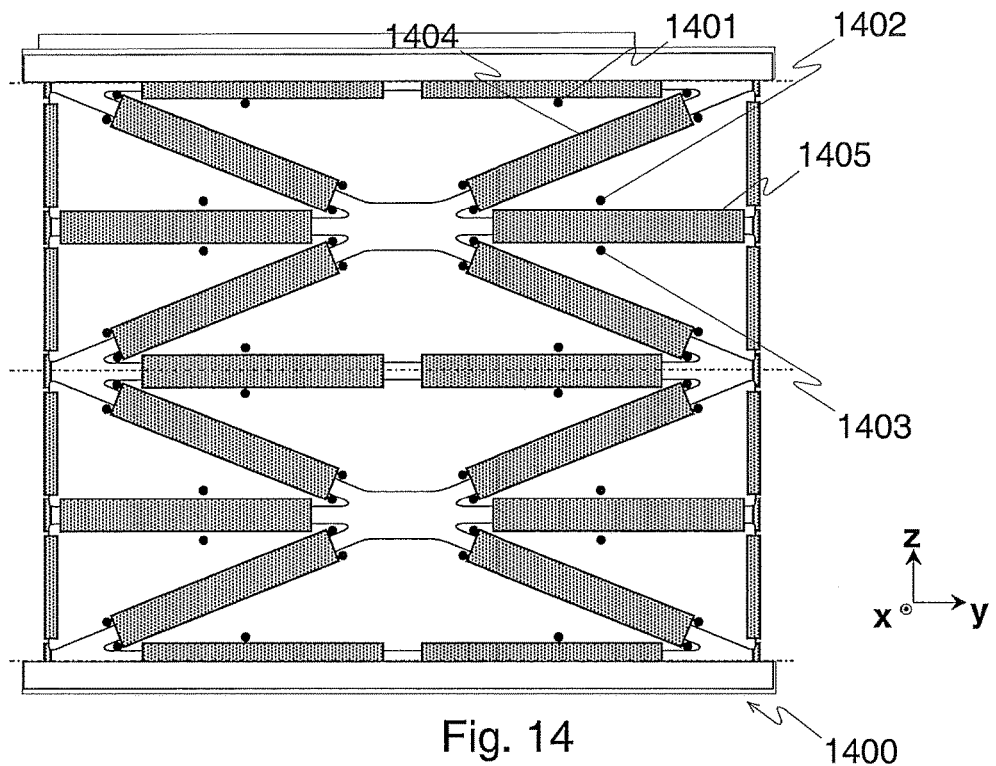
FIG. 14 illustrates an extendable structure having studs attached at various locations on the surface of the structure, according to another embodiment of the present invention.

FIG. 14 illustrates an extendable structure 1400 which is substantially identical to the embodiment shown in FIG. 5, but with the addition of a plurality of studs (indicated as black dots) to the surfaces of the triangular panels. These studs are symmetrically positioned about the hinges; for example, the locations of studs 1401 and 1402 are symmetrical about the axis of hinge 1403. Similarly, a first stud 1402 has a corresponding second stud 1403 which is located symmetrically about the axis of hinge 1404. The function of these studs will now be described with reference to FIG. 15.

Figure 15:
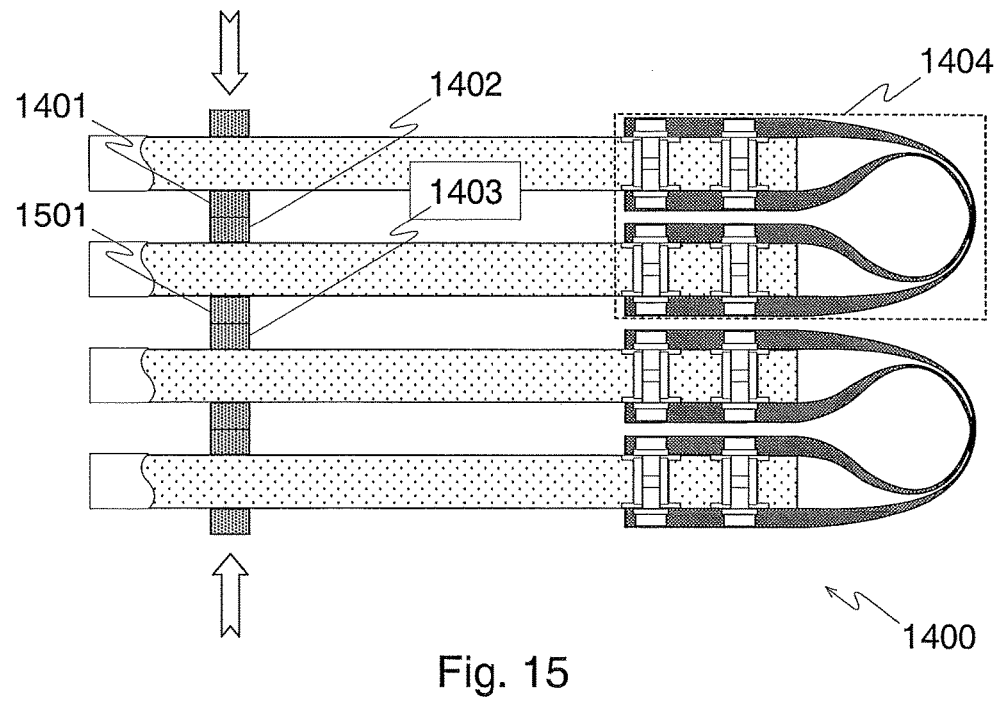
FIG. 15 shows a cross-section taken through the structure shown in FIG. 14, with the structure in the fully-collapsed configuration.

FIG. 15 shows a cross-section taken through the structure 1400 illustrated in FIG. 14, with the structure in the fully-collapsed (i.e. stowed) configuration. Studs 1401, 1402, 1501 and 1403 align along the z-axis when the structure is in this configuration, due to their symmetric positioning about the hinge axes (stud 1501 is not visible on FIG. 14, since it is attached to the rear of the panel). The studs on opposing panels contact each other in the fully-collapsed configuration, thereby controlling the panel separation. Ensuring a uniform panel separation throughout the structure has the advantage that the tension in the hinges will be uniformly distributed, allowing the structure to deploy smoothly and evenly.

The studs also provide a load path through the full length of the structure, as indicated by the vertical arrows on FIG. 15. Any compressive load on the structure will therefore be transferred through the studs and through the thickness of the panels, rather than through the hinges. This reduces the load carried by the hinges, for example when the structure is included in the body of a satellite and subjected to significant acceleration during a launch procedure.

Additionally, this load path can be used to apply a compressive force to the structure when in the stowed configuration. This securely holds the folded structure in place, preventing any shifting of the panels and hinges whilst in the stowed configuration.

Figure 16:
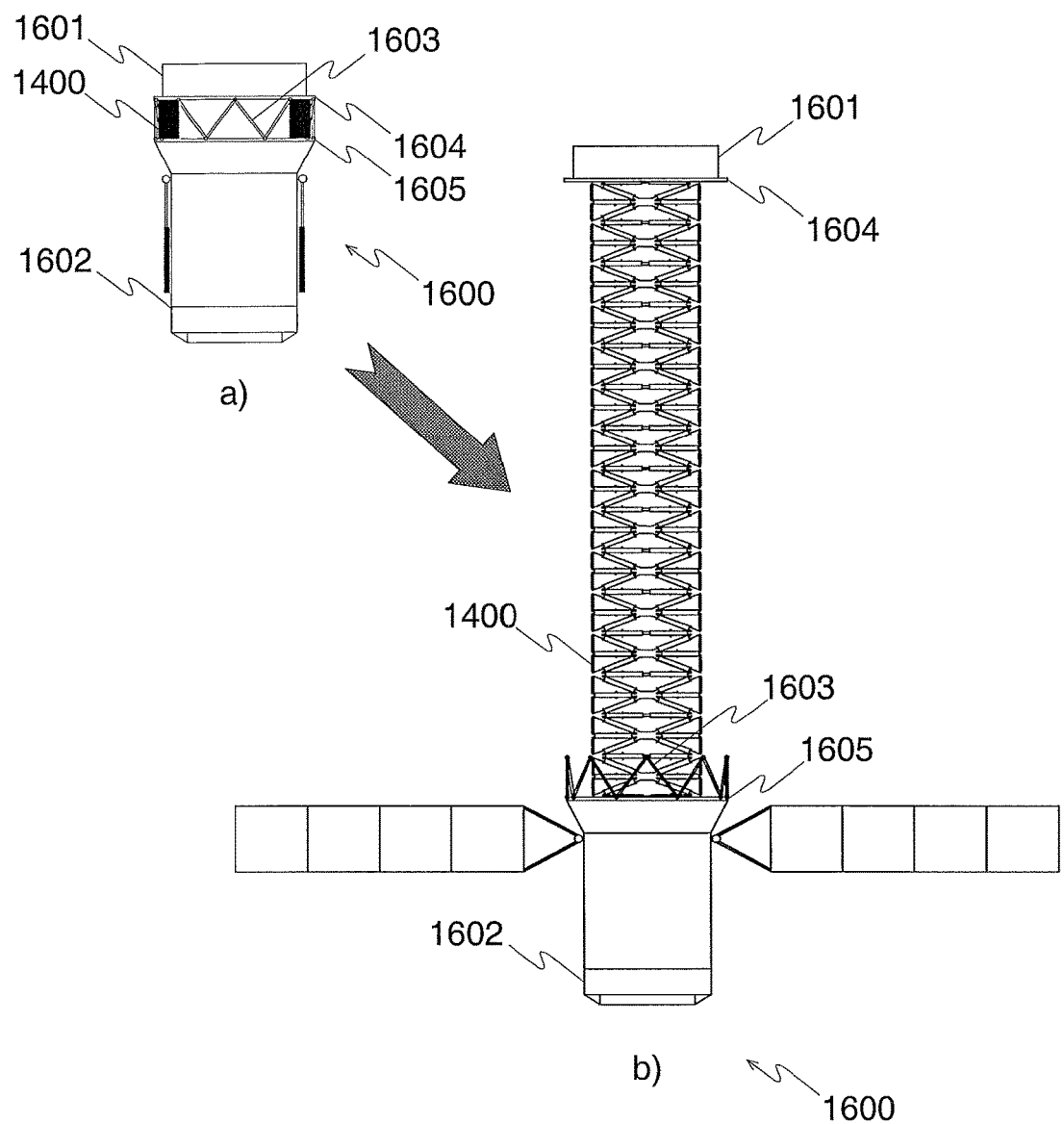
FIGS. 16a and 16b illustrate a satellite including an extendable structure according to an embodiment of the present invention.

FIG. 16 illustrates a satellite 1600 in which the extendable structure 1400 is employed to provide substantial separation between a payload 1601 and the satellite body 1602 when the satellite is in orbit (FIG. 16*b*). A hold-down mechanism 1603 is provided which comprises a series of struts around the perimeter of the structure 1400, the struts being connected to annular end-plates 1604, 1605. In the stowed configuration (FIG. 16*a*), the structure 1400 is pre-loaded in compression by adjusting contact screws (not shown) which compress the structure 1400 along the lines of studs (c.f. FIG. 15). This compressive force is balanced by a corresponding tensile force in the struts of the hold-down mechanism 1603 and bending of the end-plates 1604, 1605. In other embodiments, the struts may be replaced by a continuous cylindrical or polygonal shell structure positioned either inside or outside the annular volume of the deployable structure in its fully stowed configuration.

Once the satellite 1600 is positioned in orbit, the hold-down mechanism 1603 is released (e.g. by firing explosive bolts). With the tensile force removed, the structure 1400 extends to its full length under the force provided by the stored elastic energy in the hinges. The speed at which the structure deploys can be controlled by varying the energy stored in the hinges, for example by altering the geometry (e.g. curvature, thickness or width) of the tape springs or selecting a different material, to increase/decrease the stiffness of the hinges.

Figure 17:
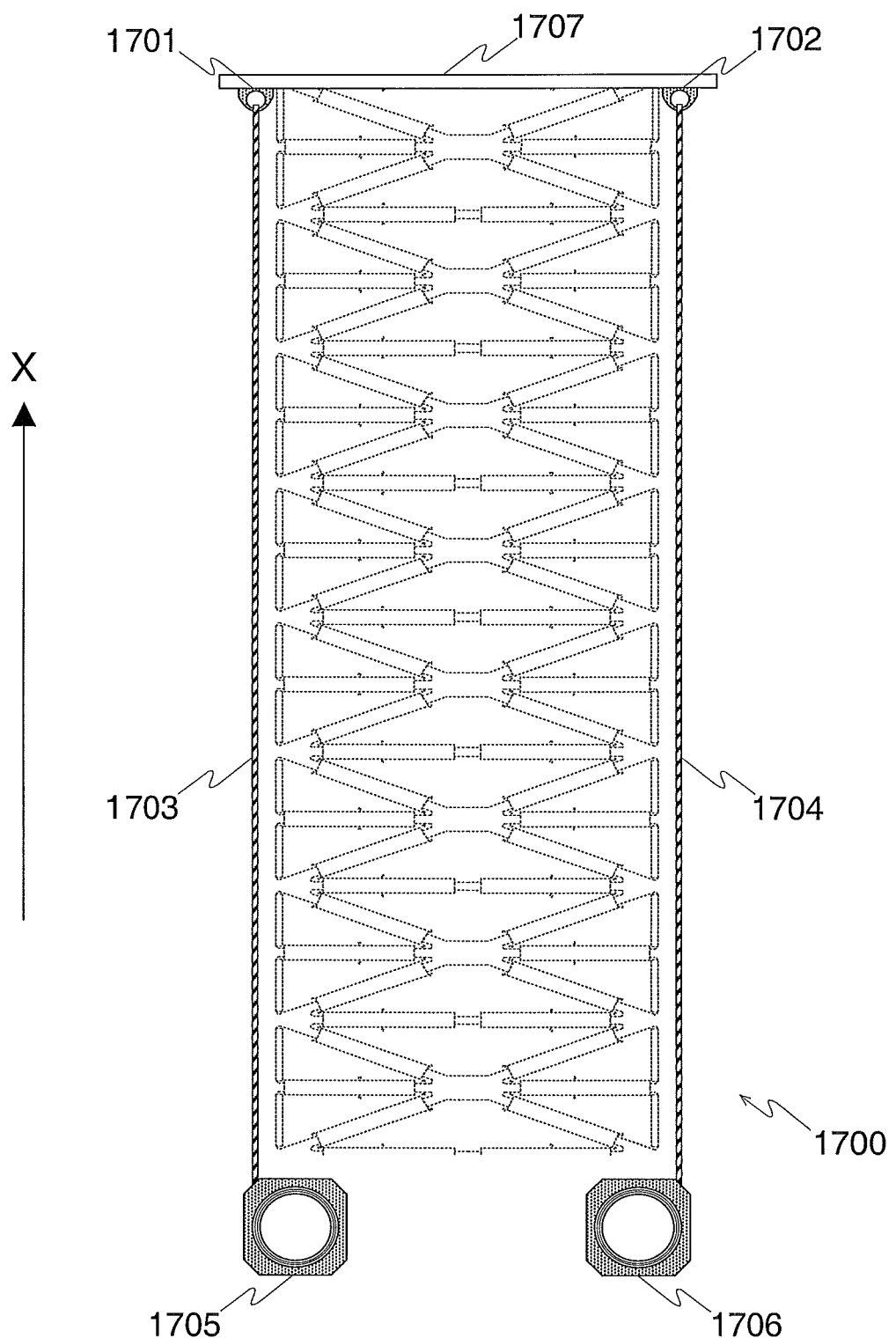
FIG. 17 illustrates an extendable structure featuring dampers to control the deployment speed of the structure, according to another embodiment of the present invention.

Alternatively, the speed of deployment can be controlled by a damping mechanism as shown in FIG. 17. FIG. 17 illustrates an embodiment of the invention in which the speed of deployment of an extendable structure 1700 is limited by first and second cables 1703, 1704 attached to an end-plate 1707 at one end of the structure, at contact points 1701 and 1702. The opposite ends of the first and second cables 1703, 1704 are connected respectively to drums 1705 and 1706, which drive rotary dampers. In the stowed configuration, each cable is wound around the drum to which it is attached, and as the structure 1700 extends during deployment the dampers maintain tension in the cables 1703 and 1704 which regulates the speed of extension of the structure. This arrangement may be particularly suitable for use in applications where the payload at one end of the structure contains sensitive instruments which may be damaged by sudden deceleration as the structure locks-out into its fully-extended configuration, or applications in which it is necessary to limit disturbances to the spacecraft attitude control systems.

Figure 18:
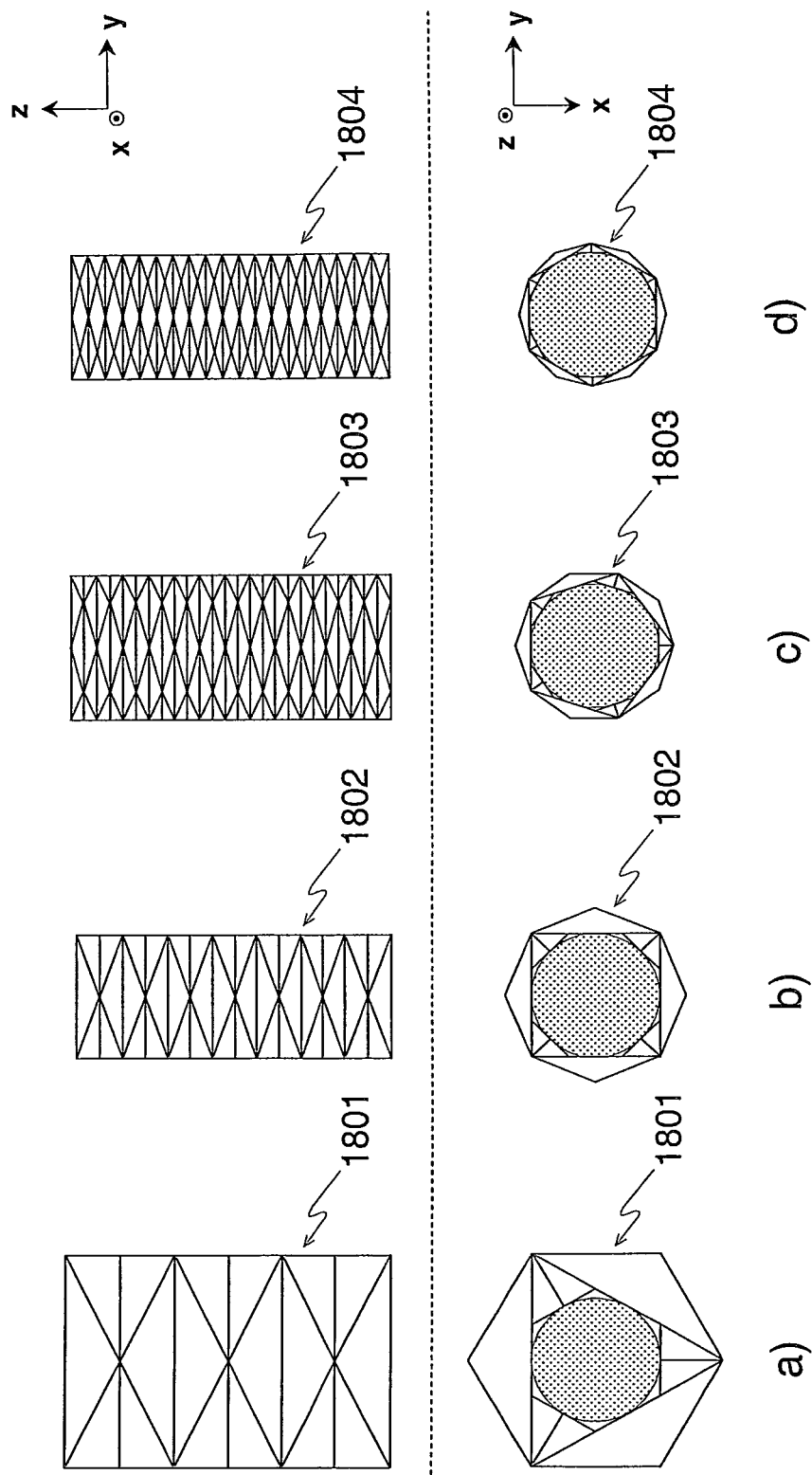
FIGS. 18a to 18d illustrate a number of extendable structures having different regular polygons as their cross-sections, according to alternative embodiments of the present invention.

Although the invention has so far been described in relation to embodiments having a square cross-section, the invention is equally applicable to structures with a wide range of cross-sections. FIG. 18 illustrates extendable structures 1802, 1802, 1803 and 1804 which have triangular (FIG. 18*a*), square (FIG. 18*b*), pentagonal (FIG. 18*c*) and hexagonal (FIG. 18*d*) cross-sections respectively. The top row of images illustrates the structures in the fully-extended configuration, whilst the bottom row of images illustrates the structures in the fully-collapsed configuration.

Each of FIGS. 18*a* to 18*d* are drawn to the same scale, such that the each structure encloses a circle of the same area (shaded). For a structure having a regular polygonal cross-section of N sides, each repeating unit has a height/width ratio corresponding to tan $\alpha$ (c.f. FIG. 4), where $\alpha=90°/N$. As can be seen from FIGS. 18*a* to 18*d*, as the number of sides increases, $\alpha$ decreases and hence the height of each repeating unit decreases (compounded by the fact that the width of the repeating unit, i.e. the side length of the polygon, also decreases). More repeating units are therefore required to achieve the same overall length of structure in the fully-extended state, increasing the complexity of the structure. However, the benefit of selecting a polygon with a high number of sides as the cross-section is clear from the bottom row of images in FIGS. 18*a* to 18*d*, namely that the area occupied by the structure in the fully-collapsed configuration reduces as the number of sides increases.

The skilled person will therefore select an appropriate cross-section depending on the need to balance the increasing complexity of the structure with the increased packing efficiency in the stowed state.

Figure 19:
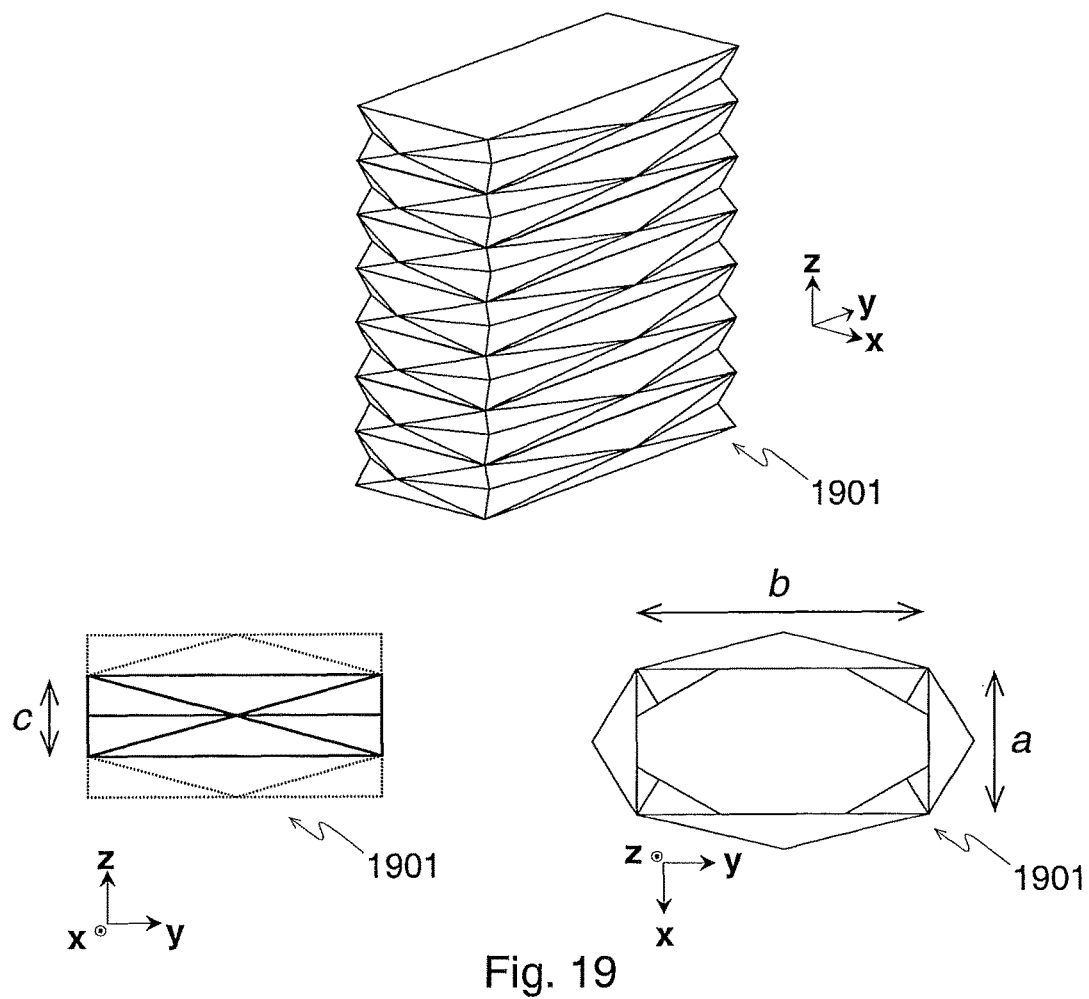
FIG. 19 illustrates an extendable structure having a rectangular cross-section, according to another embodiment of the present invention.

Furthermore, the invention is not limited to regular polygonal cross-sections. An example of a tube-like extendable structure 1901 with a rectangular cross-section is illustrated in FIG. 19. The top image of FIG. 19 illustrates the structure 1901 in the partially-extended state. The middle image illustrates detail of a single repeating unit in the fully-extended state, and the bottom image illustrates the structure in the fully-collapsed state. The height of the repeating unit will be dependent on both of the side lengths a and b, and can be calculated using trigonometry. In the embodiment shown in FIG. 9, b=2a, which gives a repeating unit of height 0.56a. For any structure with a rectangular cross-section of side lengths a and b, the height c of the repeating unit can be calculated using the formula:

$$c^2 + k_1 c + k_2 = 0$$

where $k_1$=a+b, and $k_2$=−ab.

Figure 20:
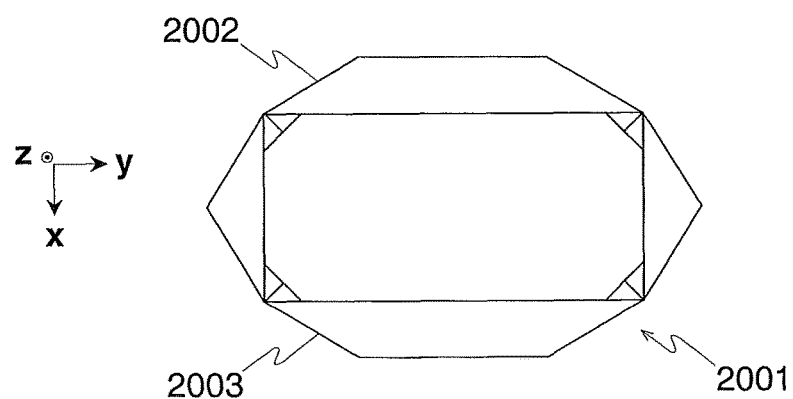
FIG. 20 illustrates an alternative extendable structure having a rectangular cross-section, according to another embodiment of the present invention.

FIG. 20 illustrates an alternative form of an extendable structure 2001 having a rectangular cross-section, according to another embodiment of the present invention. Note that unlike the embodiment shown in FIG. 19, the large panels 2002 and 2003 are no longer triangular, but are trapezoidal.

In this embodiment therefore, the equation discussed above with respect to FIG. 19 does not apply. A similar arrangement is also possible for structures having regular polygonal cross-sections.

When compared to the structure 1901 illustrated in FIG. 19, extendable structure 2001 has a shorter repeating unit, and therefore more repeating units will be required to achieve a given overall length of the structure in the fully-extended configuration. Structure 2001 will therefore be more complex than structure 1901, but may prove advantageous in certain applications since a straight horizontal edge is maintained on sections 2002 and 2003, which may simplify the attachment of particular external components.

Figure 21A:
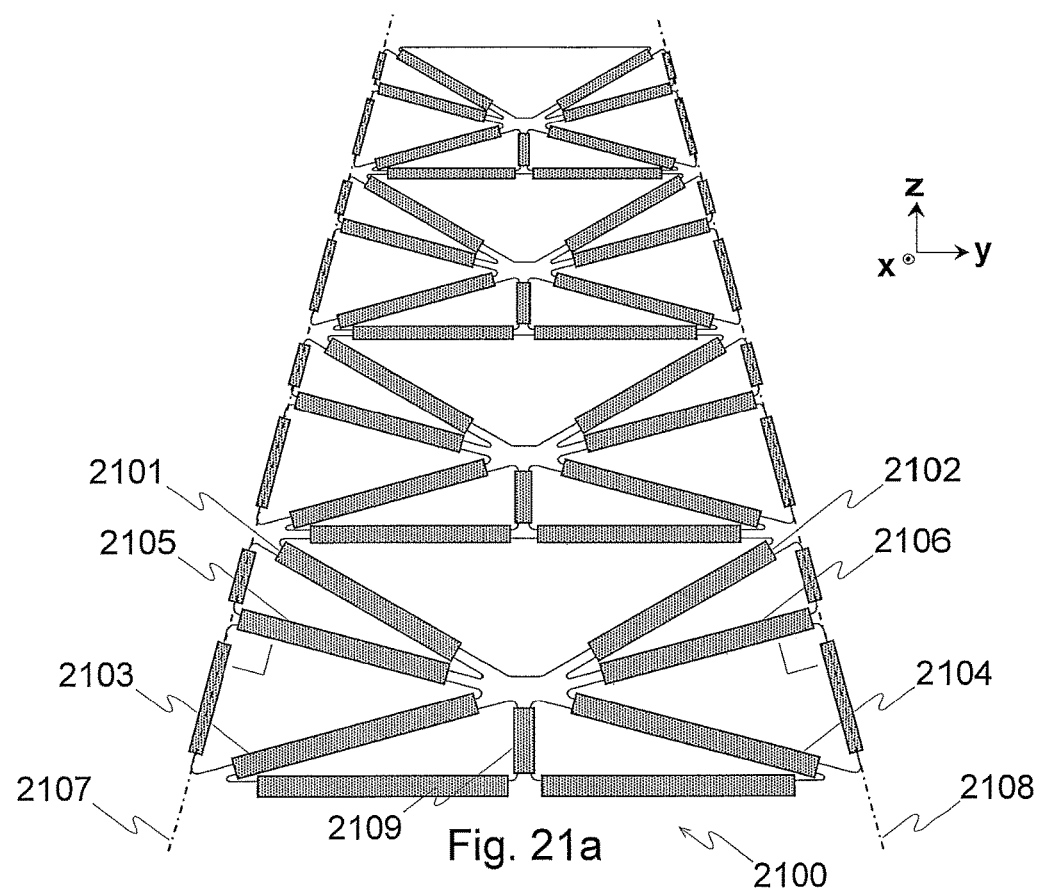
FIGS. 21a and 21b illustrate an extendable structure having a square cross section which linearly decreases in size from one end of the structure to the other, according to an alternative embodiment of the present invention.
Figure 21B:
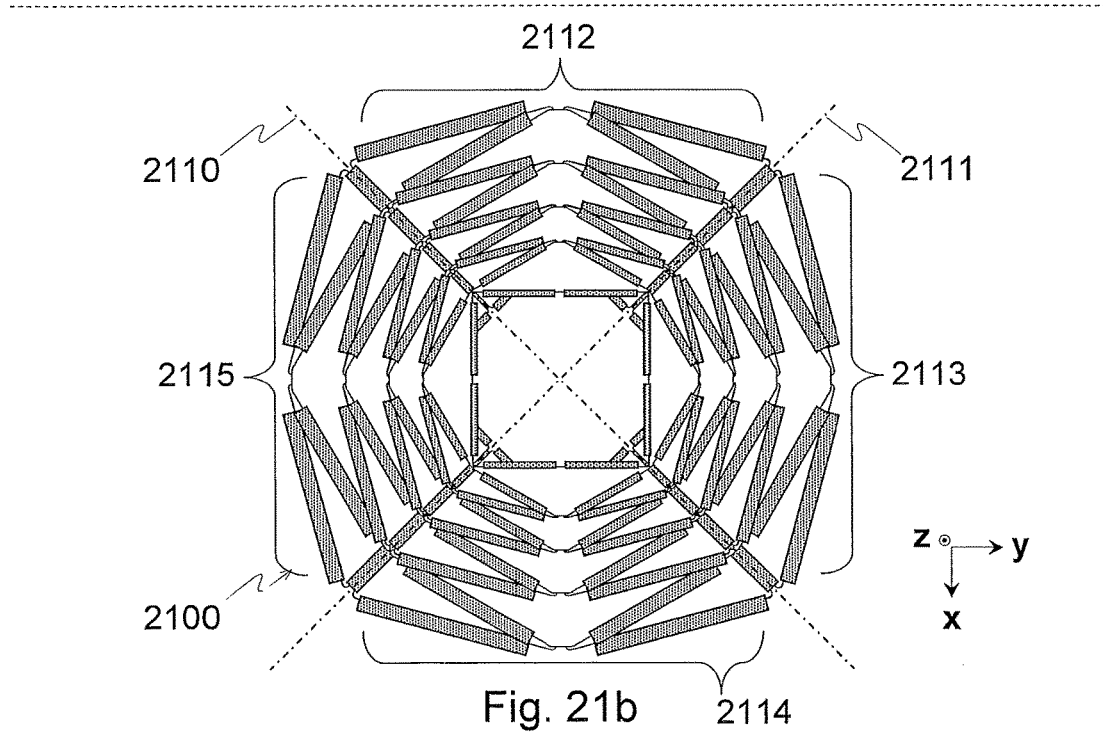

As has been briefly discussed in relation to FIG. 5, it is also possible to construct extendable tube-like structures with tapered cross-sections. FIGS. 21a and 21b illustrate an embodiment of the invention in which an extendable structure 2100 has a square cross section which linearly decreases in size from one end of the structure to the other. The structure 2100 is shown in both fully-extended (FIG. 21a) and fully-collapsed (FIG. 21b) configurations. As is the case for a structure which has a uniform cross-section (e.g. FIGS. 4 and 5, structure 400), structure 2100 comprises a plurality of repeating units. However, due to the linearly tapered cross-section, the repeating units in structure 2100 scale linearly from one end of the structure to the next, i.e. the repeating units are similar, but not identical. In structure 2100, additional type II hinges 2109 are provided which divide the bottom triangular panel into two portions. This is to accommodate relative in-plane rotation of the attached panels with respect to one another, during deployment of the structure (similar to the situation shown in FIG. 13a).

Figure 22:
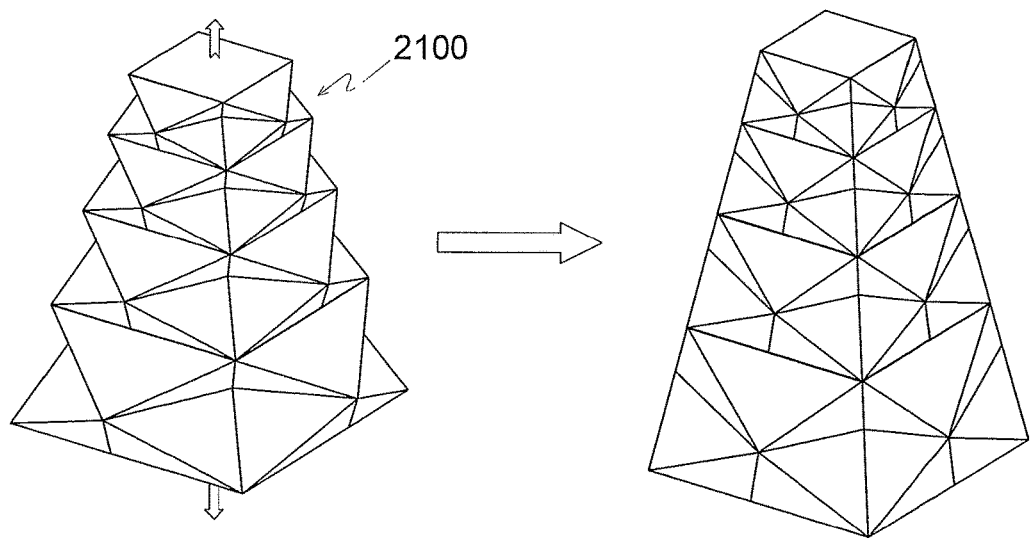
FIG. 22 illustrates the structure shown in FIGS. 21a and 21b, in both partially-extended (left image) and fully-extended (right image) configurations.

From FIG. 21a, it can be seen that each repeating unit includes a plurality of third hinges 2101, 2102, 2103, 2104 and a plurality of fourth hinges 2105, 2106. Each of the fourth hinges 2105, 2106 lies between a pair of third hinges and is perpendicular to a side edge 2107, 2108 of the structure. The third hinges 2101, 2102, 2103, 2104 are analogous to the second hinges 109, 110, 113, 114 of FIG. 1, whilst the fourth hinges 2105, 2106 are analogous to the first hinges 111, 112 of FIG. 1. FIG. 22 illustrates the structure 2100 in both partially-extended (left image) and fully-extended (right image) configurations, in perspective.

Continuing with reference to FIGS. 21a and 21b, the fourth hinges 2105, 2106 allow the side edges 2107, 2108 to collapse to lie on first and second planes 2110, 2111 (c.f. FIG. 21b) when the structure folds into the fully-collapsed configuration. This is possible because the fourth hinges 2105, 2106 lie perpendicular to the side edges 2107, 2108. The angles of the third hinges 2101, 2102, 2103, 2104 (c.f. FIG. 21a) can be adjusted in order to control the relative angles of the first and second planes 2110, 2111, and therefore the angles at which adjacent wall sections 2112, 2113, 2114, 2115 are connected to one another, and the degree of taper. This allows structures to be constructed with a polygonal cross-section having an arbitrary number of sides with different tapers.

In the present embodiment, when viewed in the fully-collapsed state along the z-axis (FIG. 21b), adjacent wall sections 2112, 2113, 2114, 2115 are connected at 90° to each other since the structure has a square cross-section, and the first and second planes 2110, 2111 make angles of 45° with each wall section.

Figure 23:
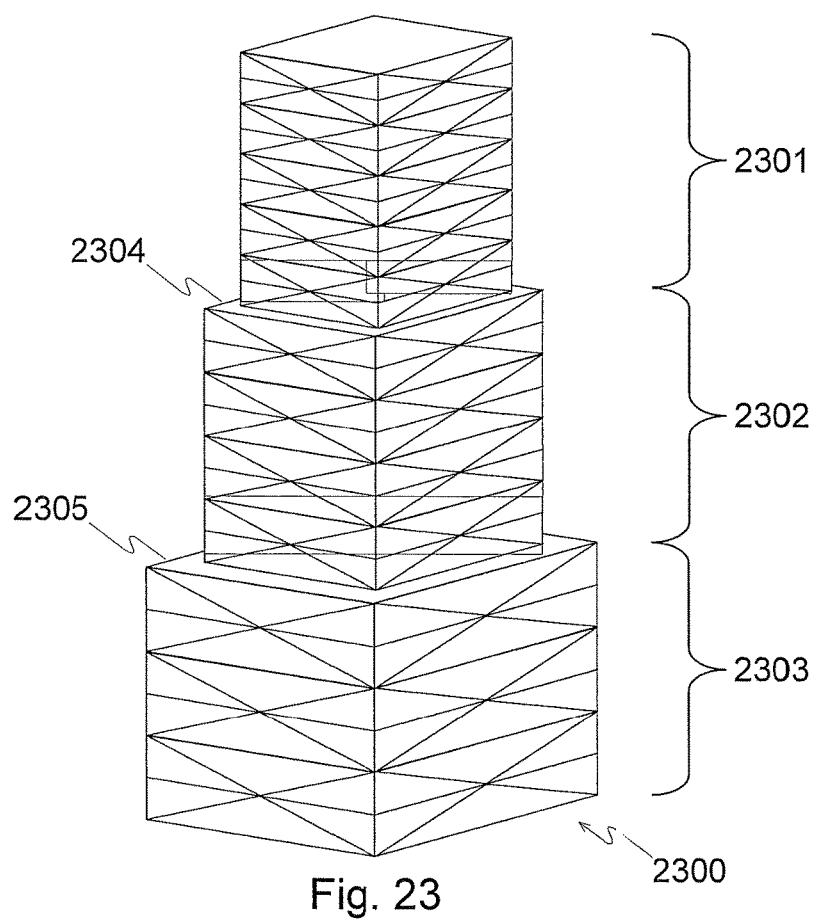
FIG. 23 illustrates an extendable structure which has a cross-section which decreases in step-wise fashion along a length of the structure, according to an alternative embodiment of the present invention.
Figure 24:
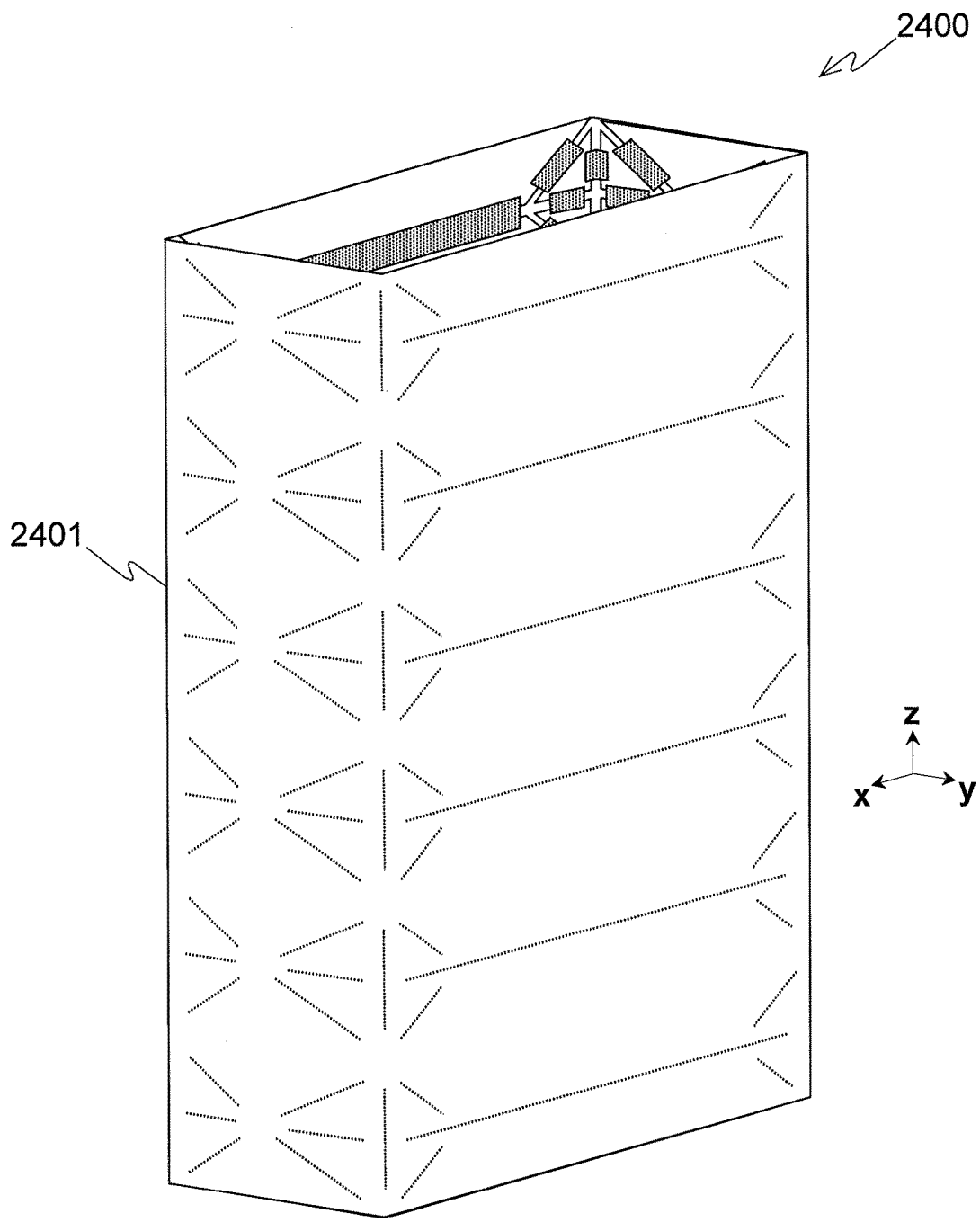
FIG. 24 illustrates an extendable structure including a shroud according to an alternative embodiment of the present invention.

FIG. 23 illustrates an extendable structure 2300 having a cross-section which decreases in step-wise fashion along a length of the structure, according to an alternative embodiment of the present invention. The structure 2300 is shown in the fully-extended configuration, and is divided into a plurality of segments 2301, 2302, 2303 which each has a uniform cross-section throughout its length. Each segment 2301, 2302, 2303 is therefore similar in construction to the structure 400 of FIGS. 4 and 5. The segments 2301, 2302, 2303 are connected by rigid annular units 2304, 2305.

Although various embodiments of the present invention have been described herein with reference to the figures, those skilled in the art will appreciate that various modifications, additions and substitutions are possible, without departing from the scope of the invention as defined by the accompanying claims.

For example, the invention has been described in relation to embodiments comprising a number of panels linked by hinges (e.g. FIG. 1). Although only solid panels have been illustrated, it may be desirable in some embodiments to provide openings in the panels to reduce weight. Similarly, the skilled person will readily appreciate that the structure could equally comprise a plurality of open, rigid frames linked by hinges, in which case the structure forms a scaffold in the extended state.

Various tube-like structures have been described in which corner hinges (i.e. type II hinges) are provided which link the side walls (e.g. FIG. 5, hinges 405, 408, 501-506). However, in some embodiments a reduced number of these corner hinges may be provided (for example, hinges only provided for every $4^{th}$ repeating unit), or in other embodiments may be omitted altogether. The corner hinges primarily resist shear stresses when the structure is in the fully-extended configuration, and may not be required if rigid end-members attached to the structure are capable of providing sufficient support.

Regarding the tape-spring hinges, embodiments have been discussed in which the hinges are provide as one or two sheets comprising a plurality of tape-springs, which are bolted on to the rigid panels of the structure. However, the skilled person will readily appreciate that alternative arrangements are possible. For example, flat sprung hinges may be provided instead of tape-springs, in which case the structure itself may be further adapted to provide the lock-out functionality of the tape-springs (e.g. by affixing stops to one or both panels to prevent them passing a certain angle, such as 180°, with respect to one another). Additionally, the hinges may be integral to one or both panels, i.e. the panels and hinges are formed as a single component, rather than separate components which are later assembled.

Embodiments have been described which feature a number of voids between the triangular panels (see, for example, FIG. 1: hole 120 at centre of each repeating unit). In certain applications, such as when the structure is employed as a lens barrel of a telescope, it is necessary to block these openings to prevent unwanted light from entering the internal portion of the structure. In this case, a flexible shroud (e.g. made from a polymer or foil sheet) can be affixed to the exterior and/or interior of the structure, fully covering any openings between the panels and/or tape-spring hinges. The arrangement of hinges in the various embodiments described above allow the extendable structures to fold into a collapsed configuration in a manner such that the surface of the structure remains substantially continuous, i.e. no large voids or gaps open up between adjacent panels during extension of the structure. This has the advantage that a flexible shroud attached to the structure can fold into the collapsed configuration without risk of stretching or tearing. Similarly, any components attached to the structure which bridge gaps between panels (e.g. electrical cabling running the length of the structure) can simply fold along the hinge lines as the structure is stowed or extended, without needing to stretch or contract.

While certain embodiments of the invention have been described above, it would be clear to the skilled person that many variations and modifications are possible while still falling within the scope of the invention as defined by the claims.

The invention claimed is:

1. An extendable structure arranged for use in space-based applications, the structure being extendable along a central axis and being movable between a fully-collapsed configuration and a fully-extended configuration, the structure comprising:
   a plurality of walls each comprising a plurality of repeating units, the walls being arranged such that in the fully-extended configuration, each wall is substantially planar and the structure has a polygonal cross-section, and each side of the polygonal cross-section is formed by one of the plurality of walls;
   wherein each repeating unit comprises a plurality of panels connected by a plurality of first hinges located along side edges of the panels, a gap formed between each adjacent connected panels;
   wherein repeating units within each wall are connected by a plurality of second hinges,
   wherein in the fully-extended configuration, each of the first hinges has a first hinge axis which is substantially perpendicular to a longitudinal edge of the wall,
   wherein in both the fully-collapsed configuration and the fully-extended configuration, the plurality of walls are arranged around the central axis to form a tubular structure,
   wherein each of the first and second hinges comprise tape-spring hinges arranged on both sides of the panels attached to the respective first or second hinge, the tape springs on opposite sides having opposing curvatures, and the tape springs being arranged to store elastic strain energy in the stowed configuration such that the first and second hinges exert a force on the structure which urges the structure towards the extended configuration,
   wherein in both the fully-collapsed configuration and the fully-extended configuration each one of the plurality of walls is connected on both sides to adjacent walls, and is configured to remain directly connected to both of said adjacent walls as the structure is moved between the fully-collapsed configuration and the fully-extended configuration, and
   wherein the plurality of panels in each repeating unit are further connected by a plurality of third hinges, each of the first hinges lying between two third hinges and the third hinges having hinge axes which are inclined with respect to said first hinge axis.

2. The extendable structure according to claim 1, wherein in the extended configuration, the first and third hinges and the longitudinal edge define triangular regions on either side of each first hinge.

3. The extendable structure according to claim 1, wherein in the extended configuration, a corner of the structure is formed where longitudinal edges of two adjacent walls meet, and in the stowed configuration the structure is folded along the first, second and third hinges such that said longitudinal edges remain substantially contiguous.

4. The extendable structure according to claim 1, wherein in the extended configuration, the first and third hinges within a wall lie on a single plane, and in the stowed configuration, said first and third hinges are moved out of said plane.

5. The extendable structure according to claim 1, wherein the structure has a regular polygonal cross-section of N sides in the extended configuration, and an angle α between the first and third hinge axes is given by $$\alpha = 90°/N$$

6. The extendable structure according to claim 1, wherein each repeating unit of each wall is connected to an other repeating unit of an other wall adjacent along the central axis by a plurality of fourth hinges.

7. The extendable structure according to claim 6, wherein in the extended configuration each one of the fourth hinges is arranged to open to an internal angle of the polygon which forms the cross-section of the structure.

8. The extendable structure according to claim 6, wherein each one of the third hinges comprises tape springs arranged on both sides of the panels attached to said third hinge, the tape springs on opposite sides having opposing curvatures, and wherein each one of the fourth hinges comprises tape springs arranged on a single side of the panels attached to said fourth hinge.

9. The extendable structure according to claim 1, wherein each one of the first, second and third hinges is arranged to open to an angle of 180° in the extended configuration, such that the panels attached to the first, second and third hinges are coplanar.

10. The extendable structure according to claim 1, wherein the first and third hinges cooperate such that in the stowed configuration, a plurality of panels which form corners of the structure are folded back towards an interior of the structure.

11. The extendable structure according to claim 10, wherein in the stowed configuration, a point at which first and third hinges meet within a repeating unit is displaced away from an interior of the structure.

12. The extendable structure according to claim 1, wherein the extendable structure forms a body of a telescope, and further comprises a flexible shroud attached to at least one of the inner and outer surfaces of the structure, the shroud being arranged to block transmission of light through the walls of the structure, and through the gaps.

13. The extendable structure according to claim 1, further comprising a plurality of studs fixed to an internal and/or external surface of the structure, the plurality of studs being arranged to be aligned in the stowed configuration to provide a continuous load path from top to bottom of the structure.

14. The extendable structure according to claim 1, wherein the structure is linearly tapered from one end of the structure to the other, such that a cross-section at one end is smaller than a cross-section at the other end.

15. The extendable structure according to claim 1, wherein each repeating unit comprises a plurality of rigid panels.

16. The extendable structure according to claim 1, comprising:
   a hole formed at a center of each repeating unit.

17. The extendable structure of claim 1, wherein in the fully-collapsed configuration the panels within each wall are substantially parallel to each other and lie on top of one another.

* * * * *